United States Patent [19]

Smith et al.

[11] Patent Number: 4,467,423

[45] Date of Patent: * Aug. 21, 1984

[54] METHOD AND SYSTEM FOR CONTROLLING AN APPARATUS

[75] Inventors: Robert L. Smith; Melvin B. Mozingo, both of Indianapolis, Ind.

[73] Assignee: Emhart Industries, Inc., Indianapolis, Ind.

[*] Notice: The portion of the term of this patent subsequent to Dec. 8, 1998 has been disclaimed.

[21] Appl. No.: 317,136

[22] Filed: Nov. 2, 1981

Related U.S. Application Data

[63] Continuation-in-part of Ser. No. 118,670, Feb. 5, 1980, Pat. No. 4,305,122.

[51] Int. Cl.$^3$ ....................... G05B 19/04; G06F 15/46
[52] U.S. Cl. ................................. 364/400; 134/57 D; 364/144
[58] Field of Search ............................... 364/140–147, 364/400; 134/57 R, 57 D, 58 R, 58 D; 68/12 R; 307/141, 141.4, 141.8; 340/309.1, 309.4

[56] References Cited

U.S. PATENT DOCUMENTS

| | | | |
|---|---|---|---|
| 3,774,056 | 11/1973 | Sample et al. | 364/143 X |
| 3,969,703 | 7/1976 | Kwiatkowski et al. | 364/144 X |
| 4,001,599 | 1/1977 | Karklys | 307/141 |
| 4,084,237 | 4/1978 | Beachem et al. | 364/400 |
| 4,104,542 | 8/1978 | Karklys et al. | 307/141 |
| 4,184,347 | 1/1980 | Tobita et al. | 364/144 X |
| 4,245,310 | 1/1981 | Kiefer | 364/400 |

*Primary Examiner*—Joseph F. Ruggiero
*Attorney, Agent, or Firm*—Robert F. Meyer

[57] ABSTRACT

A control system for a washing machine having a plurality of selectable functions, with each function including a plurality of predetermined operational steps, providing a control element for controlling the performance of each operational step, an input to the control element for selecting one of the functions, circuitry for interfacing the control element with the apparatus for allowing direct control of the operational steps by the control element, and an instruction program located within the control element for effecting the control function of the control element, the instruction program including a first instruction group for distinguishing a selected function from the other selectable functions, a second instruction group for registering the function distinguished by the first instruction group, a third instruction group for initiating performance of the predetermined operational steps of the registered function and for registering a period of performance for the initiated operational step, and a fourth instruction group for decrementing the registered period during performance of the initiated operational step and for signalling the third instruction group when the registered period equals zero for enabling the initiating and registering of the instruction group.

The third instruction group tests for the existence of flood conditions for at least four consecutive seconds and for affecting the operation of the washing machine in response to the tested existence of the flood conditions for at least four consecutive seconds.

6 Claims, 31 Drawing Figures

FIG. 1C

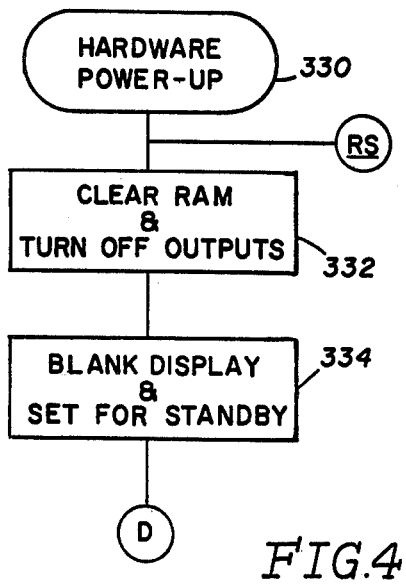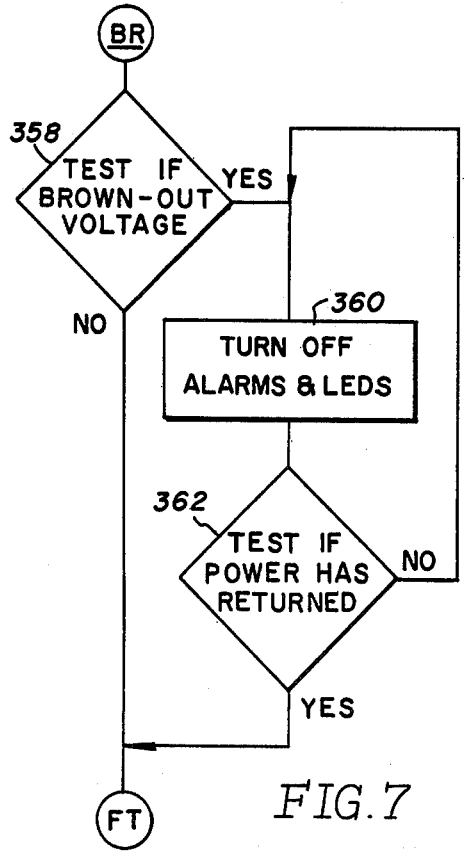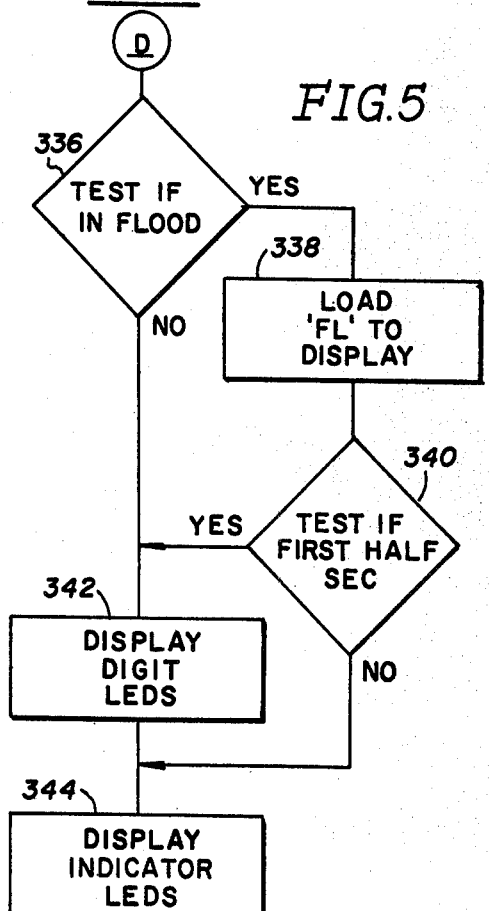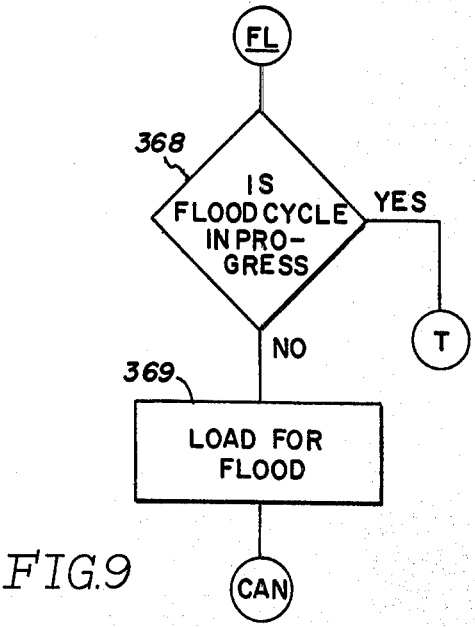

METHOD AND SYSTEM FOR CONTROLLING AN APPARATUS

BACKGROUND OF THE INVENTION

This is a continuation-in-part of U.S. patent application Ser. No. 118,670, filed Feb. 5, 1980, now U.S. Pat. No. 4,305,122.

1. Field of the Invention

This invention generally relates to control systems for apparatuses and, in particular, to methods and control systems for controlling an apparatus having a plurality of selectable functions with each function including a plurality of operational steps.

2. Statement of the Prior Art

Control systems have been used for machines and apparatuses for many years. Generally, the more complicated the machine or apparatus the greater is the usefulness of a control system for the apparatus as it increases the repeatability of proper operation by reducing opportunity for operator error. Operator convenience and output are also usually improved. In the area of convenience control, systems have been successfully applied to various consumer product machines and apparatus. With the application of digital electronic computers to control systems, their convenience and performance has even increased further. Different levels of computer control have been applied to a wide variety of consumer products such as microwave ovens, sewing machines, color televisions to name just a few, and the need remains to apply such control further and to use it to optimize performance even further.

SUMMARY OF THE INVENTION

The present invention includes a method and system for controlling an apparatus which combines a high level of flexibility and control with a degree of convenience in exercising that control. The control system of the present invention is for an apparatus having a plurality of selectable wash functions, with each function including a plurality of predetermined operational steps, and includes: a control element including a microcomputer for controlling the performance of the dishwashing apparatus; means for inputting selection of one of the wash functions to the control element; means for interfacing the control element with the dishwashing apparatus for allowing direct control of the operational steps by the control element; means for displaying wash function selections, operating conditions and operating times of the dishwashing apparatus; and an instruction program stored in the control element for affecting the operation of the control element, the instruction program having a sequence of instruction means groups for performance by the control element including a first instruction means group for controlling the display means, a second instruction means group following the first instruction means group for testing for the existence of the operating conditions and for delaying or advancing the progress of the control element through the instruction means groups in response to the tested existence of the operating conditions, a third instruction means group following the second instruction means group for testing for the existence of flood conditions in the dishwashing apparatus for at least four consecutive seconds and for affecting the operation of the apparatus in response to the tested existence of the flood conditions for at least four consecutive seconds, a fourth instruction means group following the third instruction means group for timing the operation of the wash functions and the operational steps for directing the progress of the control element in response to the timing, a fifth instruction means group following the fourth instruction means group for determining input selections to the dishwashing apparatus, and a sixth instruction means group following the fifth instruction means group for enabling the operational steps of the dishwashing apparatus in response to determined input selections from the fifth instructions means group and in response to the third instruction means group and for returning the control element to the first instruction means group thereafter.

BRIEF DESCRIPTION OF THE DRAWINGS

FIG. 1, consisting of combined FIGS. 1a, 1b and 1c is a schematic diagram of a control system constructed according to one embodiment of the present invention;

FIGS. 4 through 15 are each a breakdown of a different portion of the instruction program represented in FIG. 3;

FIG. 16, consisting of combined

DETAILED DESCRIPTION OF THE DRAWINGS

Figure 1A:
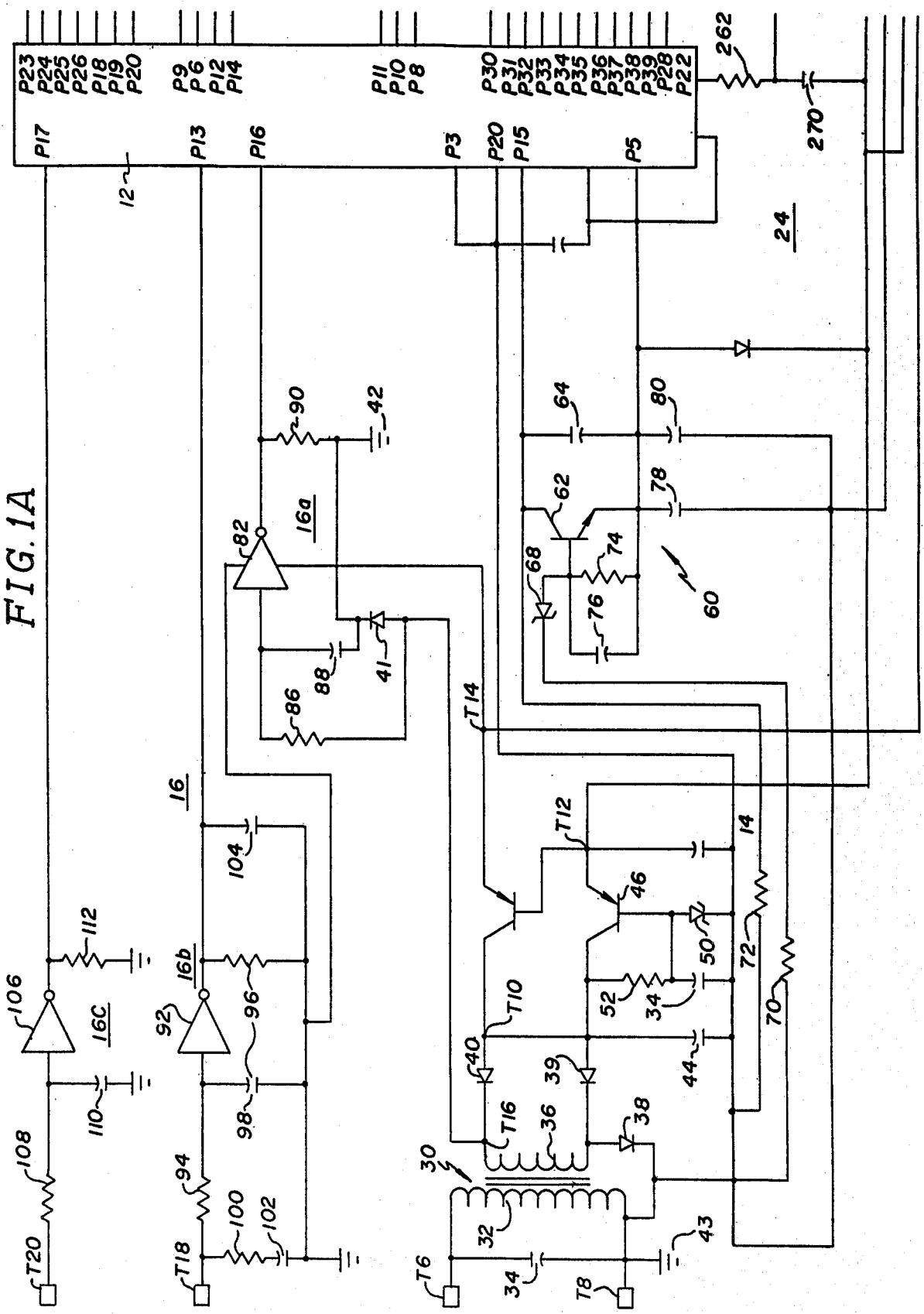
Figure 1B:
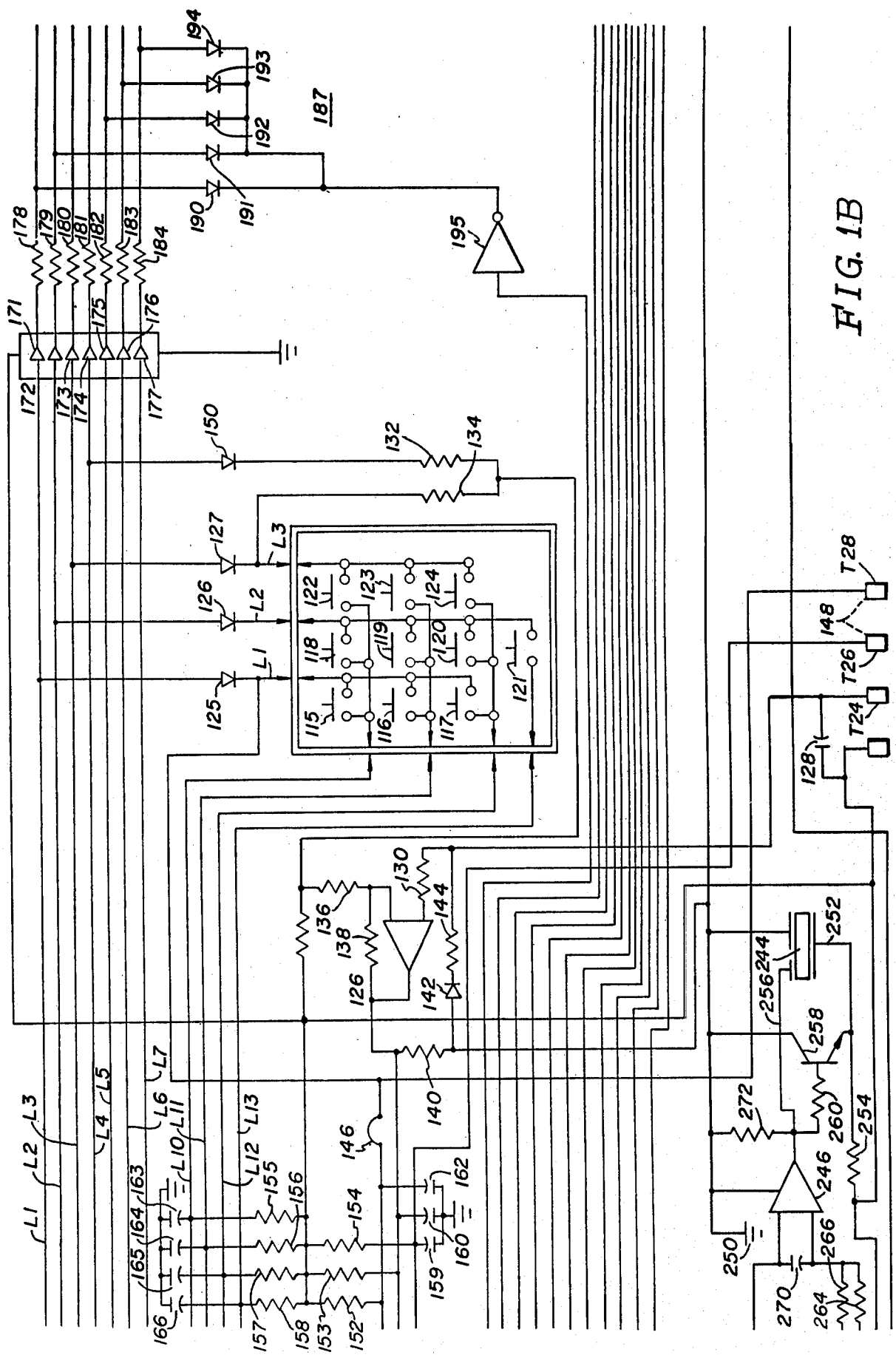
Figure 1C:
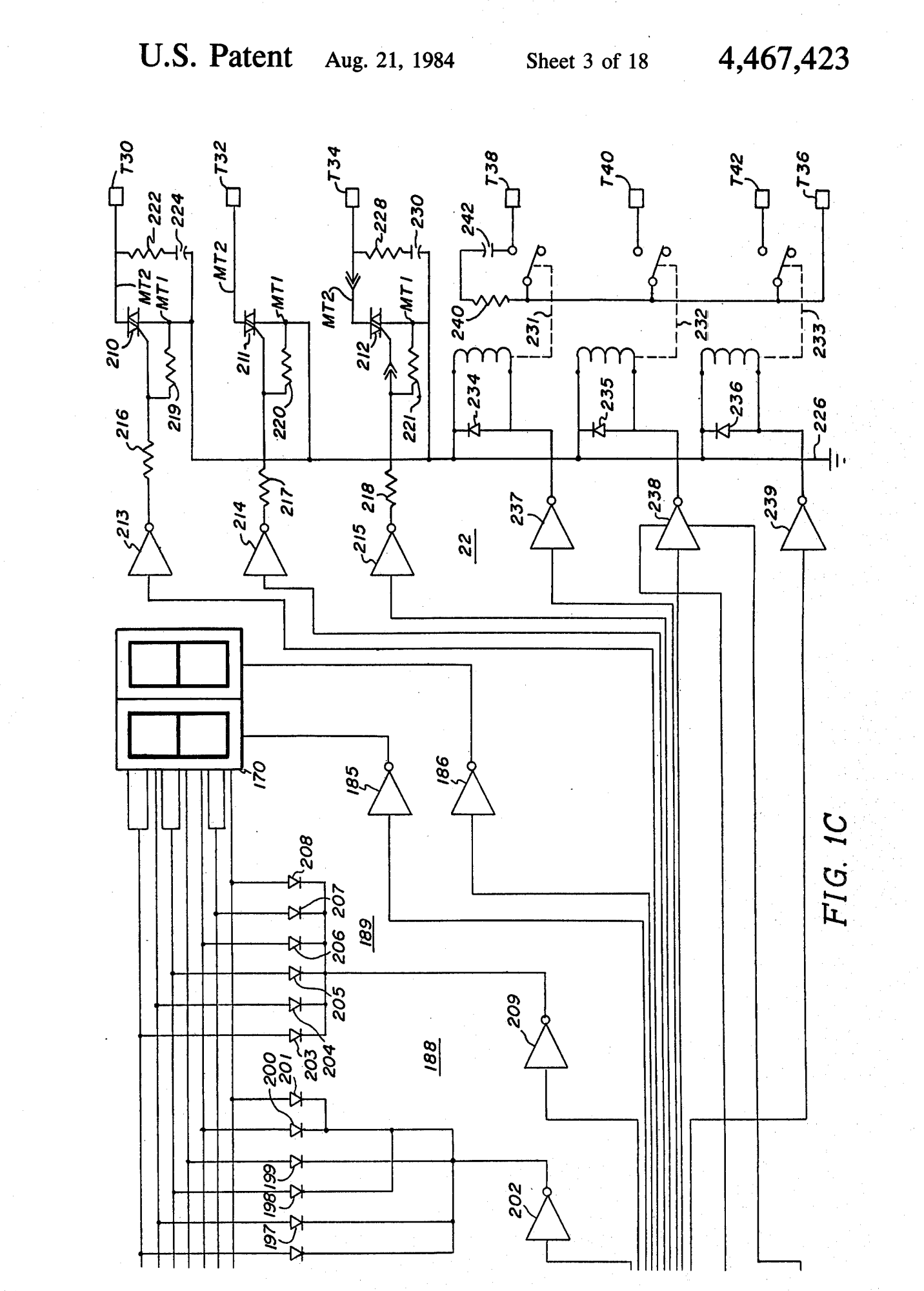
Figure 2:
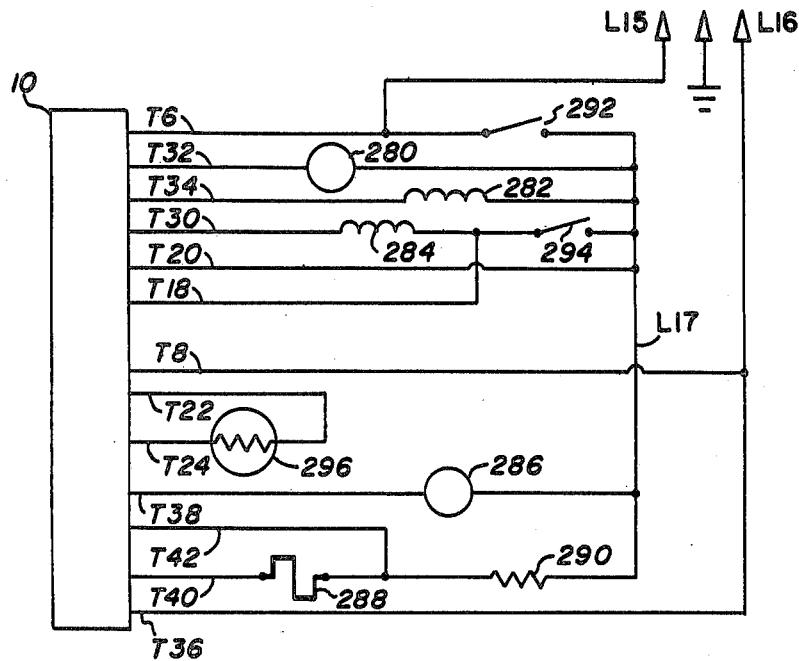
FIG. 2 is a schematic of a dishwasher with the control system of FIG. 1 appearing in block form.

The present invention is illustrated in the appended drawings as a control system for a dishwasher as would be constructed with the wiring shown in FIG. 2. It should be kept in mind, however, that the present invention is intended for use in any apparatus having a plurality of selectable functions with each of those functions having a plurality of operational steps. As is explained below in reference to the figures, the functions performable by the dishwasher are, normal wash, short wash, economy wash, pot wash, sanitary wash, delay start, plate warm, rinse and hold, hot dry and cancel and drain. The first four wash cycles are usually programmed having different numbers of wash and rinse cycles or operational steps as determined by the needs implied by their names, a standard wash cycle, i.e., a shorter wash cycle, one wash cycle less, one wash cycle more, respectively. The remainder of the functions normally include single operational steps, some of which may be used in combination with a wash function and some of which may be operated alone. For example, sanitary wash may be selected with a wash function to cause the use of hotter water. Delay start and hot dry may also be combined with any wash function. Plate warm, rinse and hold, and cancel and drain may be used alone. The hardware used to implement these various features in accordance with one embodiment of the present invention is illustrated in FIG. 1 as a control system 10. The control system generally includes a central control element 12, a power supply section 14, a condition sensing section 16, a selection input section 18, a display section 20, a control output, power interface section 22, and an alarm section 24.

The central control element 12 of the present embodiment includes a microcomputer made by Rockwell and designated MM76EL. The control element 12 includes an instruction program which enables the element 12 to sense various inputs and conditions and generate various control signals in response thereto. The operation of the control element 12 and the instruction program contained therein is discussed in reference to FIGS. 3 through 15.

The input supply section begins with input terminals T6 and T8. A transformer 30 is connected across the input terminals T6 and T8 by its primary coil 32. A capacitor 34 is also connected across the input terminals T6 and T8 for the purpose of protecting the primary coil 32 from transient voltages in the supply line. The secondary coil 36 of transformer 30 is connected to a full-wave bridge rectifier comprising diodes 38 through 41. The output terminal for the full-wave bridge rectifier is T10, which is a negative DC voltage of −8.5 volts, and DC returns are located at the grounds 42 and 43. Capacitor 44 is connected across the output of the rectifier for filtering purposes. Two series pass voltage regulating transistors 46 and 48 are connected to the output terminal T10 of the full-wave bridge rectifier. The circuit around transistor 46 includes a zener diode 50 having its anode connected to the base of transistor 46 and its cathode connected to the ground 43. Also included are a resistor 52 and a capacitor 54 connected in series between the collector of transistor 46 and ground. The junction point of resistor 52 and capacitor 54 is connected to the junction between the anode of zener diode 50 and the base of transistor 46. The zener diode has a constant reverse voltage drop of 9.1 volts which when added to, or subtracted from, the 0.6 volt base to emitter drop across transistor 46, causes an output voltage at T12 of minus (−) 8.5 volts with respect to the ground 43. An optional noise supression capacitor 56 is connected between the ground 43 and the terminal T12. The terminal T12 is connected to the base of another series pass voltage regulator embodied in transistor 48, the collector of which is connected to the DC terminal T10 and the emitter of which forms another negative voltage output terminal T14, of a minus (−) 8.0 volts.

The arrangement of the two voltage regulating series pass transistors 46 and 48 is very beneficial to the present circuit, as it provides two power sources which track relatively closely to each other throughout the various operating load levels. Because of the relatively constant base to emitter voltage drop of transistor 48 of approximately 0.5 to 0.7 volts, the output terminal voltage at terminal T14 remains at 0.5 to 0.7 volts away from the output voltage of terminal T12. By this arrangement, the output terminal T14 is used to supply the various high current components used for the present invention while the output terminal T12 is used to supply voltage to the control element 12. The tandem voltage regulators provide isolation between their respective supplies to prevent switching transients appearing on say the terminal T14 from affecting the control element 12, powered from the terminal T12. This arrangement allows the use of fewer components as only one complete voltage regulating circuit is necessary. The closeness with which these two regulators are able to track one another would otherwise only be achievable using separate voltage regulators at the cost of duplicate and more expensive regulating circuitry. Thus, the present regulating circuitry provides close tracking, isolation between the separate sources and economy of construction. For further discussion of the voltage regulation circuit of terminals T12 and T14 see U.S. patent application Ser. No. 118,558 of Robert L. Smith for VOLTAGE REGULATING CIRCUIT, filed Feb. 4, 1980 and now U.S. Pat. No. 4,290,004.

The control element 12 is connected to the ground 43 through its pin P 20. Pin P3 of the element 12 is also connected to the ground 43 for the purpose of enabling an oscillator internal of the control element 12.

The power supply section 14 also includes a power-on reset circuit 60. The main elements of which are a transistor 62 and a capacitor 64. The power-on reset circuit 60 is connected to the terminal T12 through a diode 66. The control element 12 is also connected to the voltage terminal T12 through the diode 66 at pin P5. The capacitor 64 is connected across the emitter and collector terminals of the transistor 62. A zener diode 68 and a resistor 70 connected in series are located between the base of transistor 62 and the ground terminal 43. A resistor 72 is also connected between the ground 43 and the collector of transistor 62. The emitter of transistor 62 is connected to the negative voltage supply from T12 along with a parallel network of resistor 74 and capacitor 76 which are connected between that emitter and the base of transistor 62. A pair of capacitors 78 and 80 are connected between the voltage input from terminal T12 and the ground terminal 43.

The purpose of this circuit 60 is to generate a signal after the power has reached its necessary level for causing the control element 12 to begin its instruction program. This is done by the voltage appearing across capacitor 64 which builds with the output voltage from the terminal T12. When the voltage at terminal T12 does reach the required 8.5 volts, the zener diode 68 begins to conduct and causes the transistor 62 to conduct, thus dropping the voltage across capacitor 64 from approximately 0 volts to approximately minus 8.0 volts. The control element 12 sees this at pin P15 and is thereby caused to begin its instruction program. The circuit 60 may also be used for emergency battery power in the event that a momentary power shortage occurs. This is accomplished at least through the use of the capacitor 80 which will continue to power the control element through pin P5 during a brief voltage outage at terminal T12. Battery inputs may also be provided at this point in circuit 60 for this purpose. The diode 66 prevents the power supply from draining power from the capacitor 80 in the event that a power failure does occur and allows all of the charge stored in the capacitor 80 to be used to maintain the input voltage to the control element 12.

It should be noted at this point that the embodiment presently being described works on a positive logic with zero volts generally representing a logic 1 and minus 8.5 volts generally representing a logic 0.

The enabling input section 16 provides three condition input signals for the control element 12. The first enabling input circuit 16a is connected to the AC terminal T16 of the full-wave bridge rectifier. The circuit includes an operational amplifier 82 powered on the high side by ground and on the low side by the negative 8.0 volts of terminal T14. The input to the amplifier comes from the terminal T16 through a resistor 86. A capacitor 88 is connected between the input and ground and a resistor 90 is connected between the output and ground. The output is also connected to pin P16 of control element 12. The signal thus provided is used by the control element 12 for the purpose of generating time signals based upon the operating line frequency of the power supply. Thus, the signal appearing at pin P16 is a square-wave signal at the line frequency having a high voltage of 0 volts and a low voltage of negative 8 volts.

The second enabling input circuit 16b is intended to be connected to an emergency float switch through terminal T16. The circuit 16b includes an operational amplifier 92 having its input connected through a resistor 94 to the input terminal T18 and its output connected to pin P13 of control element 12. A resistor 96 is connected between the output of amplifier 92 and ground. A capacitor 98 is connected between the input to amplifier 92 and ground, and a series circuit including resistor 100 and capacitor 102 are connected between the input terminal T18 and ground. The input signal for this circuit is derived from a float device and a microswitch which normally connects the line voltage of approximately 115 volts AC through the microswitch to the terminal T18. The absence of this voltage indicates that a flood condition exists and the resulting signal at the input pin P13 of control element 12 causes the instruction program located within the element 12 to drain the washing chamber. A capacitor 104 is connected between pin P13 and ground for the purpose of noise supression. It should be noted that the input signal at terminal T18 is the full line voltage, which is normally too much for the input of an operational amplifier such as 92. The amplifier presently used includes a dropping resistor located between the input terminal and T14, and thus the combination of that resistor and resistor 94 makes a voltage divider circuit which reduces the input voltage to the operational amplifier 92. The amplifier 92 is also otherwise powered by the negative 8.0 volts of T14 and ground in the same manner as amplifier 82. Connection lines have been deleted for clarity of the drawing.

The third enabling input circuit 16c likewise includes an operational amplifier 106 which has its input connected through a resistor 108 to an input terminal T20. The terminal T20 is intended to be connected to a door switch as an indication of whether the door is open. When the door is closed the line voltage is connected to the terminal T20 and when the door is open the voltage is disconnected. The circuit 16c includes a capacitor 110 connected between the input of operational amplifier 106 and ground and a resistor 112 connected between the output of operational amplifier 106 and ground. The output of operational amplifier 106 is connected to pin P17 of control element 12. The operational amplifier 106 also includes an internal resistor between the input pin and T14 to combine with the resistor 108 to form a voltage divider network to protect the input of operational amplifier 106. As both of the input signals on terminals T18 and T20 are derived from line voltage the resulting output connected to the control element on pins P13 and P17 is a square-wave at the line frequency having a high voltage of 0 volts and a low voltage of minus 8 volts. The amplifier 106 is also otherwise powered by the negative 8.0 volts of T14 and ground in the same manner as amplifier 82. Connection lines have been deleted for clarity of the drawing. The amplifier 106 is also used as a brown-out indicator circuit. The valve of resistor 108 may be selected with respect to the resistor located internally between the input and ground to cause the amplifier 106 to cut off operation when the voltage at T20 falls below a certain minimum. Thus, both the opening of the door and/or the reduction of the supply voltage below a minimum level have the same effect on the output of amplifier mode and cause the instruction program of element 12 to go into a standby mode.

The input section 18 of the system 10 is composed of an assembly 114 of ten switches 115 through 124. The switches 115 through 124 are momentary contact pushbutton switches which are used to connect the lines L1, L2 and L3 to lines L10, L11, L12 and L13 as a means of indicating input selections. The lines L1, L2 and L3 originate from pins P23, P24 and P25 of control element 12. A series of isolation diodes 125, 126 and 127 are located in lines L1, L2 and L3, respectively. The input lines L10, L11, L12 and L13 are connected to pins P9, P6, P12 and P14, respectively, of control element 12. The input selections are distinguished by tne control element 12 by the transmission of pulses at different points in time along the lines L1, L2 and L3 and by the respective times of reception of those pulses on the input lines L10, L11, L12 and L13. As applied to a dishwasher, pushbutton 115 corresponds to a rinse and hold function; pushbutton 116 corresponds to a plate warm function; pushbutton 117 corresponds to a delay start function; pushbutton 118 corresponds to an economy wash function; pushbutton 119 corresponds to a normal wash function; pushbutton 120 corresponds to a short wash function; pushbutton 121 corresponds to a pot wash function; pushbutton 122 corresponds to a sanitary wash function; pushbutton 123 corresponds to a hot dry function; and pushbutton 124 corresponds to a cancel and drain function.

Another type of input is sensed by an operational amplifier 126. This input is the temperature created across a thermistor connected to terminals T22 and T24. A capacitor 128 is also connected across the terminals T22 and T24. The thermistor high terminal T24 is connected through a resistor 130 to the negative input of the operational amplifier 126. The positive input terminal of operational amplifier 126 is connected to the lines L3, and L4 through resistors 132 and 134, respectively, and a third resistor 136, serially. A feedback resistor 138 is connected between the output of the operational amplifier 126 and its positive input. The output of amplifier 126 is connected to pin P10 of the control element 12. A resistor 140 is connected between the output of the amplifier 126 and ground. A series diode-resistor circuit comprising diode 142 and resistor 144 is connected between ground and the negative input terminal of amplifier 126, with the anode of diode 142 connected to ground, its cathode connected to the resistor 144 and the other end of resistor 144 connected to the negative input through resistor 130. In order to measure temperature, the control element 12 transmits a digital pulse along line L3 which passes through resistor 132 to give the positive input terminal of amplifier 126 a bias. If the output from the thermistor indicates a temperature of less than approximately 130° F. the input pulse does not show up on the output terminal of the operational amplifier, and the control element 12, which is monitoring pin P10, reads this as an indication that the temperature is still below 130° F. If the output from the thermistor indicates a temperature above 130° F., the pulse at the positive input of the amplifier 126 shows up at its output and indicates to the control element 12 that the temperature is above 130° F. In the latter case, the control element then transmits another pulse along line L4 which passes through resistor 134 to the positive input of the amplifier 126. If the temperature indicated by the thermistor is below 150° F., this pulse again does not show up at the output of the amplifier 126 and the control element 12 realizes that the temperature is above 130° F. but below 150° F. If the temperature indicated by the thermistor is above 150° F. the pulse from line L4 shows up at the output of amplifier 126 and tells the control element 12 that the temperature is above 150° F. Thus, the control element 12 can determine when the temperature of the wash water is between 130° and 150° F. for normal wash functions and above 150° F. for the sanitary wash function.

Other input signals for the control element 12 are the 50 Hz jumper 146 and the 60 times test speed 148. The 50 Hz jumper is used when the line power for the control system is 50 Hz and causes pulses transmitted along line L1 to show up at input pin P11 of the control element 12, indicating to the element 12 that it is operating at 50 Hz. The test sequence of input 148 is achieved by placing a jumper between the input terminal T26 and T28 of the system 10. This causes digital pulses transmitted along line L1 to show up at pin P8 of the control element 12 indicating that the test mode is selected and causing the control element 12 to proceed through its instruction program at 60 times normal speed.

Various incidental components are used at different points within the input circuit 18. An isolation diode 150 is used between line L4 and the resistor 134. A plurality of resistors 152 through 158 is used to connect input pins P11, P10, P8, P9, P6, P12 and P14 to the negative voltage supply of T12 for the purpose of clamping those inputs and preventing any unwanted signals from registering as inputs. Likewise, a plurality of capacitors 159 through 166 is connected between ground and the input pins P8, P10, P11, P9, P6, P12 and P14, respectively, for the purpose of noise supression.

The display section 20 includes a light emitting diode display 170. In the present embodiment the display is manufactured by Monsanto and bears the designation MAN 6740. The standard seven segment display inputs are connected to lines L1 through L7 of control element 12. Power inverters 171 through 177 and resistors 178 through 184 are connected, respectively, in series in lines L1 through L7. The individual display digits of the display 170 are gated through power amplifiers 185 and 186 from pins P33 and P34 of control element 12. Three groups of light emitting diodes 187, 188 and 189 are also connected to the various output pulse lines L1 through L7. The first group 187 includes light emitting diodes 190 through 194 which are connected by their anodes to lines L1, L2, L5, L6 and L7, respectively, and by their cathodes to the output of amplifier 195 which in turn is connected to pin P30 of control element 12. The second group of light emitting diodes 196 through 201 are connected to the output lines L1, L2, L3, L4, L5 and L7, respectively, by their anodes and by their cathodes to the output of an amplifier 202. The input of amplifier 202 is connected to control element 12 at pin P31. The third group of light emitting diodes 189 includes diodes 203 through 208 which are connected by their anodes to output lines L1, L2, L3, L5, L6 and L7, respectively. The diodes are connected by their anodes to the output of an amplifier 209 which has its input connected to the control element 12 at pin P32. The three groups of light emitting diodes 187, 188 and 189 are used to indicate the various cycles and functions that the dishwasher is in. They are intended to light upon a combination of a digital pulse received at their anodes from their respective output lines L1 through L7 and an enabling signal from their respective amplifiers 195, 202 and 209. In the present embodiment, the light emitting diodes correspond to functions and conditions as follows: 190 to rinse and hold; 191 to plate warm; 192 to wash; 193 to rinse; 194 to dry; 196 to economy wash; 197 to normal wash; 198 to short wash; 199 to pot wash; 200 to rinse agent; 201 to add a dish; 203 to sani-heat; 204 to hot dry; 205 to cancel and drain; 206 to less than 130° F.; 207 to more than 130° F.; and 208 to above 150° F.

The control signal power interface section 22 includes a plurality of means for interfacing the output signals from the control element 12 to the various power requirements of the different operative features. The circuit includes three triac semiconductor devices 210, 211 and 212. Each of these triacs is controlled through their gate terminal by power amplifiers 213, 214 and 215, respectively. These amplifiers are connected to their respective triac gates through resistors 216, 217 and 218, respectively. The triac circuits each include resistors 219 through 221, respectively, connected between their gates and first main terminals MT1. The second main terminal MT2 of triac 210 is connected to an output terminal T30 which is intended to be connected to a fill valve for the dishwasher water. A resistor 222 and a capacitor 224 are connected between the output terminal T30 and ground potential 226. The triac 211 has its second main terminal MT2 connected to an output terminal T32 which is intended to be connected to the blower of the dishwasher. The triac 212 has its second main terminal MT2 connected to an output terminal T34 which is intended to be connected to the drain solenoid of the washing compartment. A resistor 228 and a capacitor 230 are connected in series from the terminal T34 to the ground potential 226. The inputs of the power amplifiers 213, 214 and 215 are connected, respectively, to output pins P35, P36 and P37 of control element 12.

The output control power interface section 22 also includes a multiplicity of relays 231, 232 and 233. The relays 231, 232 and 233 each include a relay coil having diodes 234 through 236, respectively connected thereacross for the purpose of protecting the powering integrated circuit upon deactivation of the relay coil. The cathodes of the diodes 234 through 236 and their respective relay coil connections are connected to the ground potential 226 and the anodes of the diodes 234 through 236 are connected, respectively, to the outputs of power amplifiers 237, 238 and 239. The amplifiers 237, 238 and 239 receive their input signals from pins P38, P37 and P28, respectively, of the control element 12 and receive input power from ground on the high side and minus 8.0 volts of T14 on the low side. The power connections of amplifier 238 are typical for amplifiers 185, 186, 213, 214, 215 and 237.

The output contacts of the relays 231, 232 and 233 each has a terminal in common which is connected to terminal T36. Terminal T36 is normally connected to a common AC ground terminal. The terminal T38 is connected to the normally open contacts of relay 231 and is intended to provide power for the pump of the dishwasher. A resistor 240 and a capacitor 242 are connected in series between the common terminal of T36 and terminal T38. A terminal T40 is connected to the normally open contact of relay 232 and is intended to be connected to the heater and soap dispenser means of the dishwasher. A terminal T42 is connected to the normally open contact of relay 233 and is intended to be connected to the heater coil of the dishwasher.

As mentioned, the control system 10 also includes an alarm device 24, basically comprising a sonalert device 244 and an operational amplifier 246. The main terminal 248 of the sonalert device 244 is a piezoelectric oscillator and is connected to a ground potential 250. Base terminal 252 of the oscillator is connected through a resistor 254 to the negative 8.5 volt supply of terminal T12. The feedback terminal 256 of the oscillator 244 is connected to the output of operational amplifier 246. A transistor 258 has its collector connected to the input terminal 248 of the oscillator and its emitter connected to the main terminal 252 of the oscillator. The base of transistor 258 is connected through a resistor 260 to the output terminal of the amplifier 246 and thus the feedback terminal 256 of oscillator 244. The positive input of operational amplifier 246 is connected to the control element 12 at pin P22 through a resistor 262. The negative input of operational amplifier 246 is connected to the ground 43 through a resistor 264 and to the negative 8.5 volt supply of terminal T12 through a resistor 266. A capacitor 268 is connected between the positive and negative inputs of the operational amplifier 246 to act as a noise supressor. A capacitor 270 is connected between the positive input of amplifier 246 and the negative 8.5 volt supply of terminal T12. The purpose of capacitor 270 is to filter pulses eminating from pin P22 to keep the minimum voltage thereacross high enough to hold the output of amplifier 246 to a ground potential. When the voltage at pin P22 is a negative 8.5 volts, the resulting output of amplifier 246 is allowed to float which allows the base of transistor 258 to vary and the piezoelectric oscillator to operate. When a series of pulses is emitted from pin P22, the output of amplifier 246 is held at ground potential causing the transistor 258 to remain conductive and preventing the sonalert device from operating.

Referring now to FIG. 2, the various operative elements of a dishwasher are shown along with the power connections therefor. The operative elements shown are a fan motor 280, the coil to the drain solenoid 282, the energizing coil to the fill valve 284, a pump 286, a detergent dispenser 288, and a heater element 290. Additional elements which indicate various conditions are a door switch 292, a float switch 294 and a thermistor 296. The control system 10 is shown with several of its output terminals labelled. The power is inputted to the dishwasher on input lines L15 and L16. L15 is connected to the door switch 292 and to the control system 10 at input power terminal T6. The other side of door switch 292 is connected to a bus line L17 which supplies power to the remainder of the operative elements. By this arrangement, opening the door of the dishwasher opens the switch 292 thus disconnecting power to the operational components but not interrupting the power connected to the control element 12. The fan 280 is connected between the bus line L17 and the terminal T32 of control system 10. The energizing coil of the drain solenoid 282 is connected between the bus line L17 and the terminal T34 of control system 10. The float switch 294 is connected between the bus line L17 and the terminal T18 of control system 10. The energizing coil of fill valve 284 is connected from the float switch 294 to terminal T30 of control system 10. This connection causes disconnection of any power to the fill valve under flood conditions which would open the float switch 294. The bus line L17 is also connected to the terminal T20 of control system 10. The thermistor 296 is shown as connected to terminals T22 and T24 of control system 10. The pump 286 is connected between the bus line L17 and the terminal T38 of control system 10. The heater coil 290 is shown connected between the bus line L17 and the terminal T42 of control system 10. The detergent dispenser 288, which in this case is a bimetallic strip, is shown connected between the terminals T42 and T40 of the control system 10. Through this connection, the control system 10 can activate either both the detergent dispenser 288 and the heater 290 by applying the AC return to terminal T40 or just the heater 290 by simply applying the AC return to the terminal T42. The other input line L16 is connected to the control system 10 at T8 as a power input connection and at T36 as the AC return connection for the relays 231 through 233.

As shown, the control system 10 is applied for controlling an apparatus having a plurality of functions, the more primary of which functions include a plurality of operational steps. Each of the operational steps is in turn performed by one of a combination of the operative elements of the apparatus; i.e. a wash step might include the fill, pump, heat and dispense elements, or a dry step may include either the fan and heater elements or simply the fan element. It is the function of the instruction program located in control element 12 to properly direct the performance of a selected function by the sequencing of operative elements according to predetermined operational steps.

Figure 3:
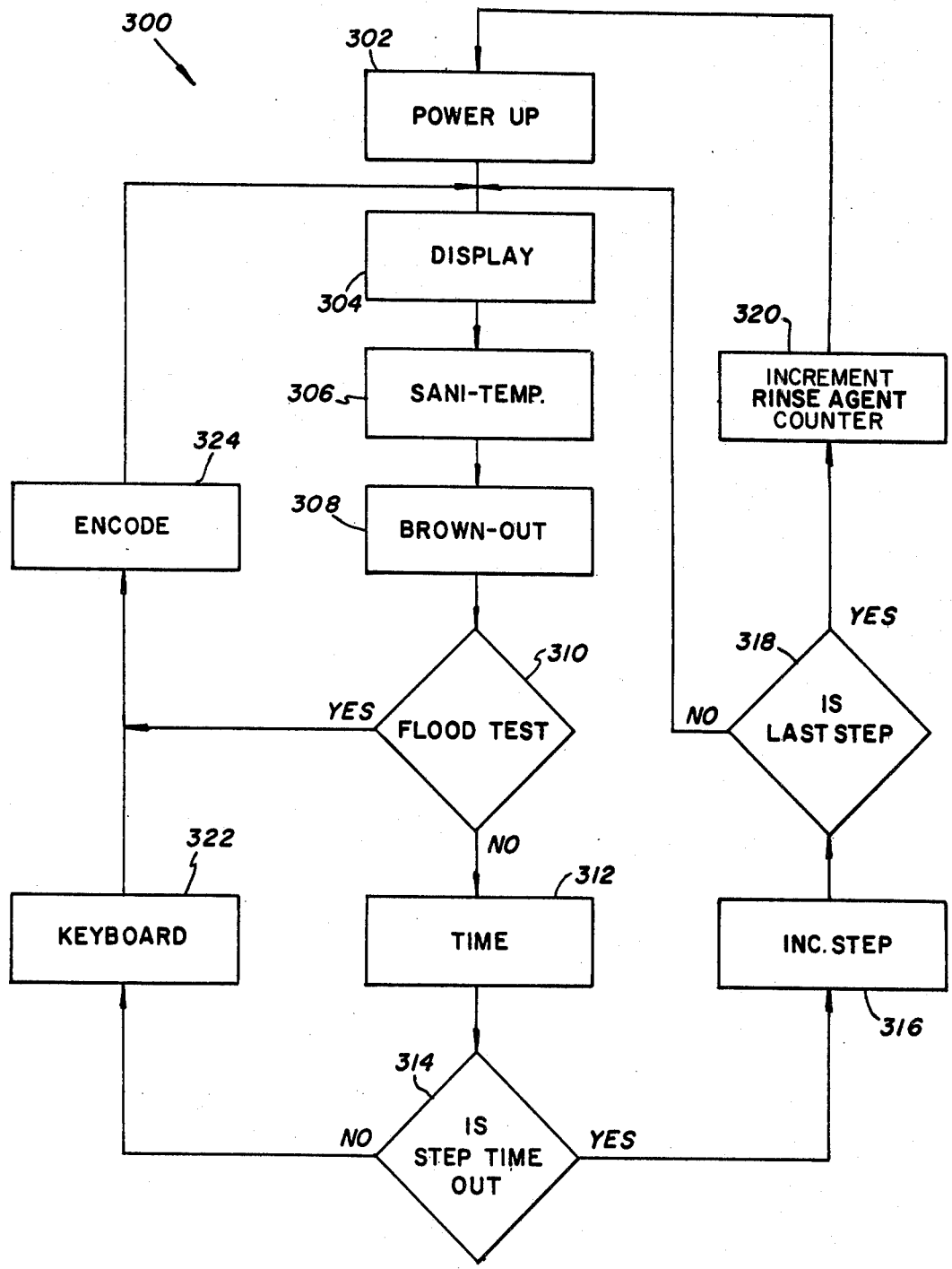
FIG. 3 is a generalized flow chart of an instruction program capable of effecting control of the dishwasher of FIG. 2 by the control system of FIG. 1.

Therefore, the operation of the control system 10 of FIG. 1 will now be described in respect to the flow diagrams of FIGS. 3 through 15 as a means of explaining the instruction program located within the control element 12. The instruction program 300, which is intended to act in control of an automatic dishwasher is shown by a generalized flow chart in FIG. 3. FIG. 3 includes the major functional areas of the instruction program 300 along with their general interrelationships. The first group of instructions in the instruction program 300 is the power up group 302. Generally, this group of instructions in the program initializes the various registers and flags used throughout the program. The next group of instructions in the program is the display group 304. Generally, the display group 304 simply causes the section 20 to indicate information stored in various flags and registers within the control element 12. The next instruction group in the program 300 is the sani-temp group 306. The sani-temp group 306 generally determines whether the temperature indicated by the thermistor 296 of FIG. 2 is either below 130° F., between 130° F. and 150° F., or above 150° F. and stores that information in one of several flags or registers in the control element 12. The next instruction group in the program 300 is the brown-out group 308 which determines whether the voltage of the supply power is sufficient for operating the dishwasher. In the event that the voltage is insufficient, the group 308 reduces the power consumption of the control element by turning off various outputs and holds the program 300 in a standby mode until the voltage of the power supply rises to the minimum required level. The group 308 employs the door switch connected to terminal T20 and thus performs the same in instances when the door is opened. The following instruction group in the program 300 is the flood test group 310 which is indicated as a question block. The flood test group 310 generally determines whether a flood condition exists and in the event that it does, the sequence 310 directs the program 300 to the encode instruction group for causing a cancellation of any operation in progress and initiation of a drain operation for the washing compartment. In the event that a flood condition does not exist, the program 300 proceeds to the time instruction group 312. The time group 312 controls the timing of various output functions of the control element 12. The instruction group 314 which follows the time group is related thereto and generally determines whether the step function in which the dishwasher is operating is complete. In the event that the allocated time has expired the program 300 proceeds to the increment step instruction group 316. The group 316 generally controls the changing of the operation of the dishwasher between steps. The following last step instruction group 318 is related to the increment step 316 as it determines whether the last step has been performed. In the event that it has not been performed, the program 300 proceeds back to the display group 304 for cycling through various of the groups previously discussed until the last step is performed. When the last step has been performed the program 300 proceeds to the rinse agent counter instruction group 320 which increments a counter to determine when a reservoir of rinse agent located within the dishwasher needs to be refilled.

In the event that the step time has not run out when the program 300 reaches the instruction group 314, as is the case when the program is making its initial pass and when the washer is in the middle of a cycle step, the program 300 proceeds to the keyboard instruction group 322. The keyboard group 322 includes instructions which test the pushbuttons 115 through 124 and direct the program 300 along various routes in response to the information obtained therefrom. Next the program 300 proceeds to the encode instruction group 324. The encode group 324 includes instructions which read the pushbutton inputs 115 through 124 again and store the selection information thereby obtained in various registers and flags of the control element 12.

The instruction program 300 is shown in greater detail by FIGS. 4 through 15 which elaborate on the instruction groups of FIG. 3. More specifically, FIG. 4 generally represents the power-up group 302 of FIG. 3. The block 330 thereof represents the turn-on step of the control system 10, which would include the signal generated on the power-on reset pin P15 of the control element 12. Instruction block 332 follows block 330 and represents the initial steps of the element 12 in clearing its random access memory and making sure that all output functions are turned off. Instruction block 334 follows block 332 and causes the element 12 to cancel all output signals for the display means 20 and set a flag for what is called a "standby" mode.

The program next proceeds to the display group 304 of FIG. 3, which is generally represented in FIG. 5. The first instruction block 336 is a test to determine whether a flood condition exists. This test is performed against a register located in the element 12 in which a flood condition would have been loaded at another point in the program. If a flood condition does exist, the program proceeds to instruction block 338 in which it loads an "FL" into the registers which hold information to be displayed by the display means. Next, the program proceeds to block 340 in which it tests if it is in the first half of a second or the second half of a second. This is done because the display of an "FL" signal is flashed on and off, being on for one-half of a second and off for one-half of a second. If the program happens to be in the on portion of the cycle, the program proceeds to instruction block 342 wherein it causes the "FL" information stored in certain registers to be physically displayed by the display means 20. If the program was not aware of a flood condition, the answer to instruction block 336 would be no and the program would proceed to instruction block 342 to display the information otherwise stored in its display output registers. From the instruction block 342, the program proceeds to instruction block 344 where it displays information on the light emitting diodes numbered 190 through 194, 196 through 201 and 203 through 208. The program 300 causes this function to occur regardless of whether there is a flood condition or not or whether it is proceeding from instruction block 42 or from instruction block 40.

Figure 6:
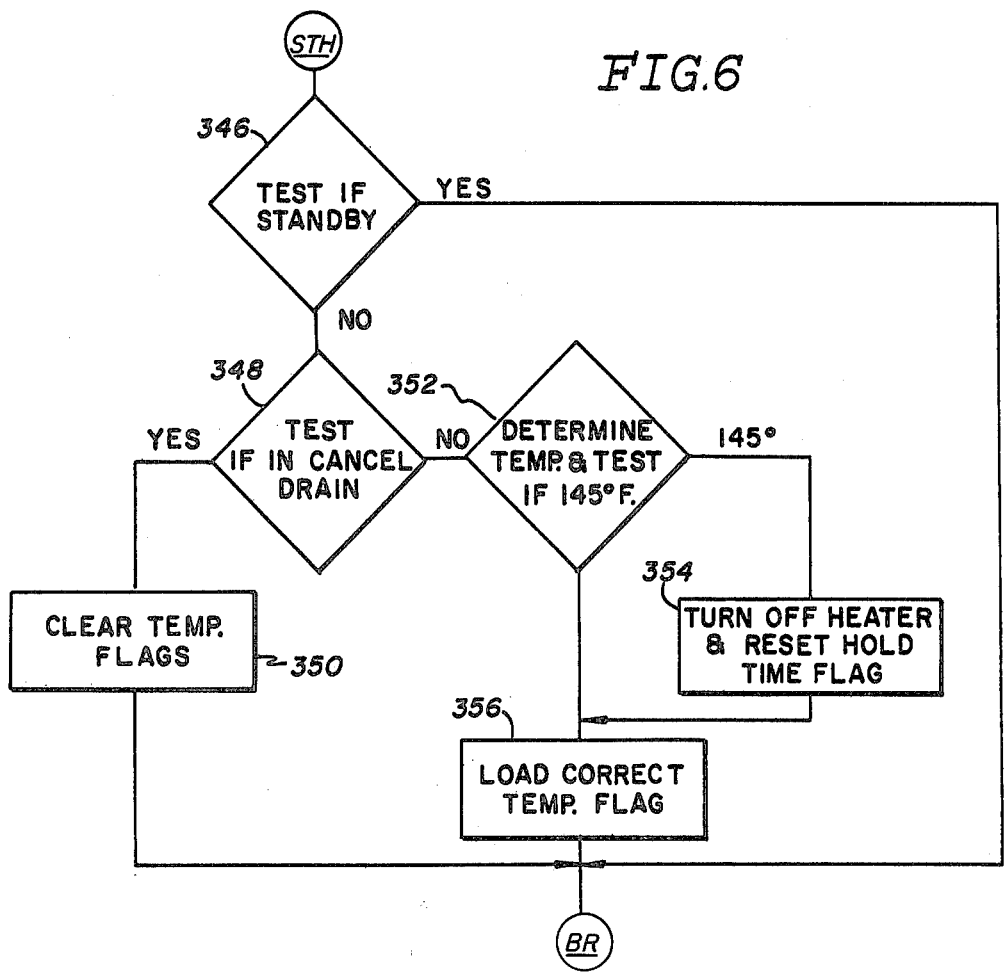

Next, the program 300 proceeds to the sani-temp instruction group 306 of FIG. 3 which is generally represented in FIG. 6. The first instruction block 346 of this instruction group is a question block which determines whether the flag indicating a "standby" mode as set in instruction block 334 is present. If it is present, the program proceeds to the brown-out instruction group 308 in FIG. 3. If the "standby" mode is not indicated, the program proceeds to instruction block 348 which tests another flag within the control element 12 to determine if the cancel and drain function has been indicated. In the event that it has, the program clears the temperature flag which is used to store information for the light emitting diodes 206, 207 and 208 and proceeds to the brown-out group 308. In the event that a cancel and drain operation is not indicated, the program proceeds to instruction block 352 where it performs the tests described previously in respect to amplifier 126 and thermistor inputs T22 and T24 to distinguish the temperature range that the thermistor is indicating. In the event that the temperature range indicated is that greater than 150° F., the program proceeds to instruction block 354 where it causes a turn-off of the heater element and a reset of a hold time flag which is described in greater detail below. If the program determines that the temperature range is lower than 150° F. or after the element 12 turns off the heater and hold time flag according to instruction block 354, it proceeds to instruction block 356 where it loads the correct temperature flag register for display according to instruction block 344.

The instruction program 300 then proceeds to the brown-out instruction group 308 which is generally represented in FIG. 7. The first instruction block of the brown-out group 308 is block 358 which determines whether the input line voltage is above or below a certain level. One possible level to test for is 90 volts. If the input voltage is above this level, the program proceeds to the flood test instruction group 310. If the input voltage is below the required level, the program proceeds to instruction block 360 where it first turns off certain outputs such as alarms and light emitting diodes. The program 300 then proceeds to instruction block 362 where it re-tests to determine whether the line voltage is still below the required minimum. If the voltage is still below this minimum, the program proceeds back to instruction block 360 and continues to recycle through 360 and 362 until the line voltage rises above the required minimum level. When the voltage has so risen, the instruction program 300 proceeds to the flood test instruction group 310. As mentioned, this portion of the program treats the door open condition as an acute case of brown-out.

Figure 8:
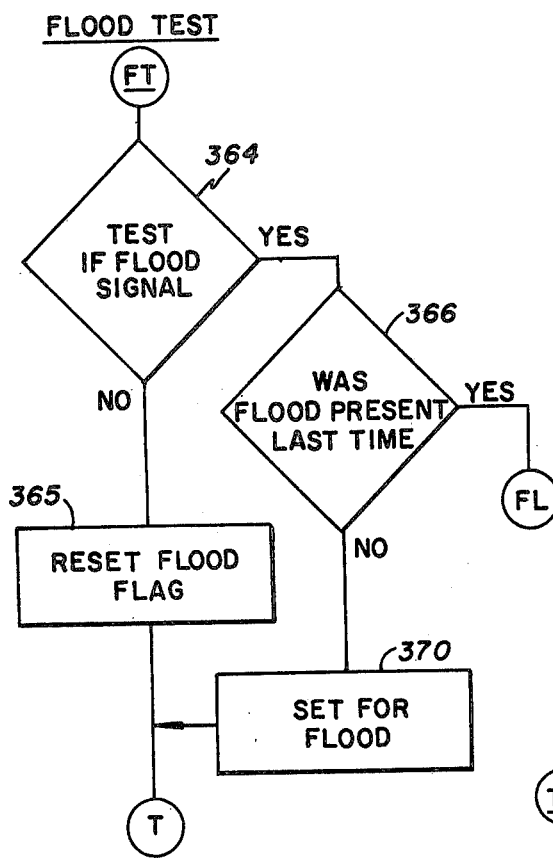
Figure 13G:
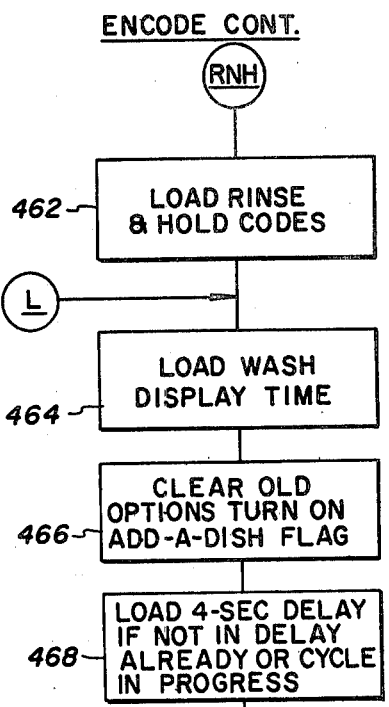
Figure 13E:
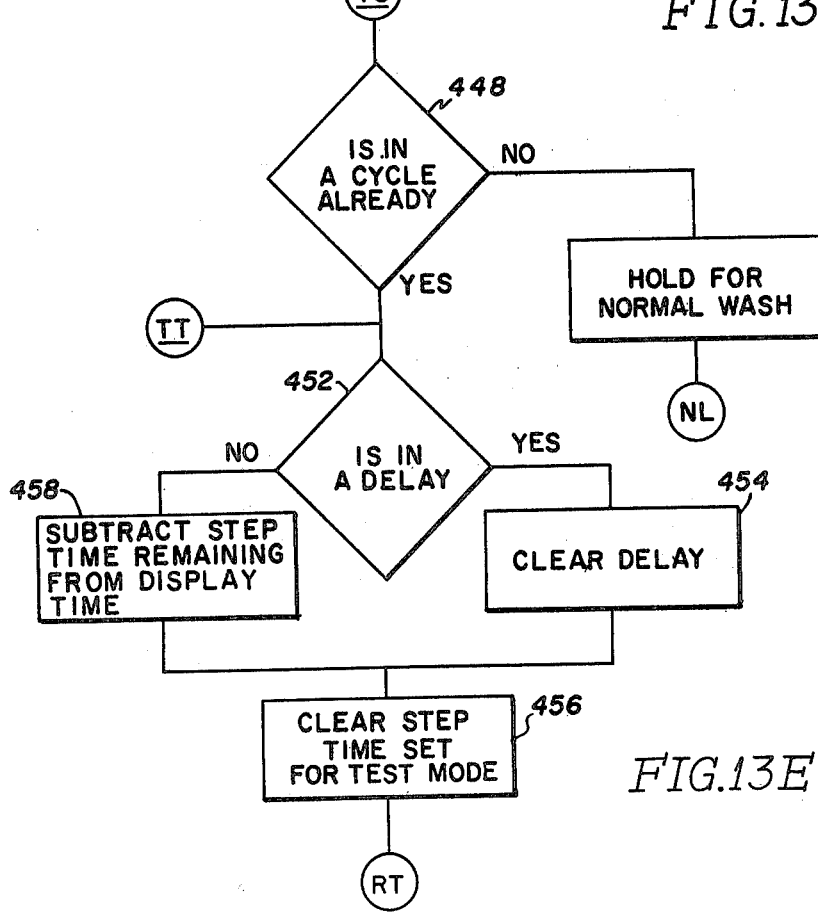

The flood test group 310 is generally shown in FIG. 8 and includes a first instruction block 364 which determines whether a flood signal is present via terminal T18 of FIG. 1. In the event that a flood signal is not present, the program 300 proceeds to instruction block 365 where it resets a first flood flag in case it might have been previously set. After this, the program proceeds to the time instruction group 312. In the event that a flood signal is present at instruction block 364, the instruction program 300 proceeds to instruction block 366 where it determines whether the floor was present during the last cycle through this portion of the program by testing the first flood flag. If the first flood flag was not previously set, the program 300 proceeds to instruction block 367 wherein it sets the first flood flag. After block 367, the program proceeds to the time instruction group 312. On the next loop through instruction block 366, the first flood flag will have been set and the program will proceed to instruction block 368 of FIG. 9, where it tests whether a second flood flag has been set and also whether the cancel and drain mode has been encoded. If either of these conditions is not present, the program proceeds to the instruction block 369 where it loads the second flood flag. After this, the program proceeds to a portion of the encode group 324 and encodes a cancel and drain mode. The second flood flag is the flag which is tested in instruction block 336 for the purpose of loading an "FL" in the display registers. If both the second flood flag and the cancel and drain encoding is set at instruction block 368, the program proceeds to the time instruction group 312.

Figure 10:
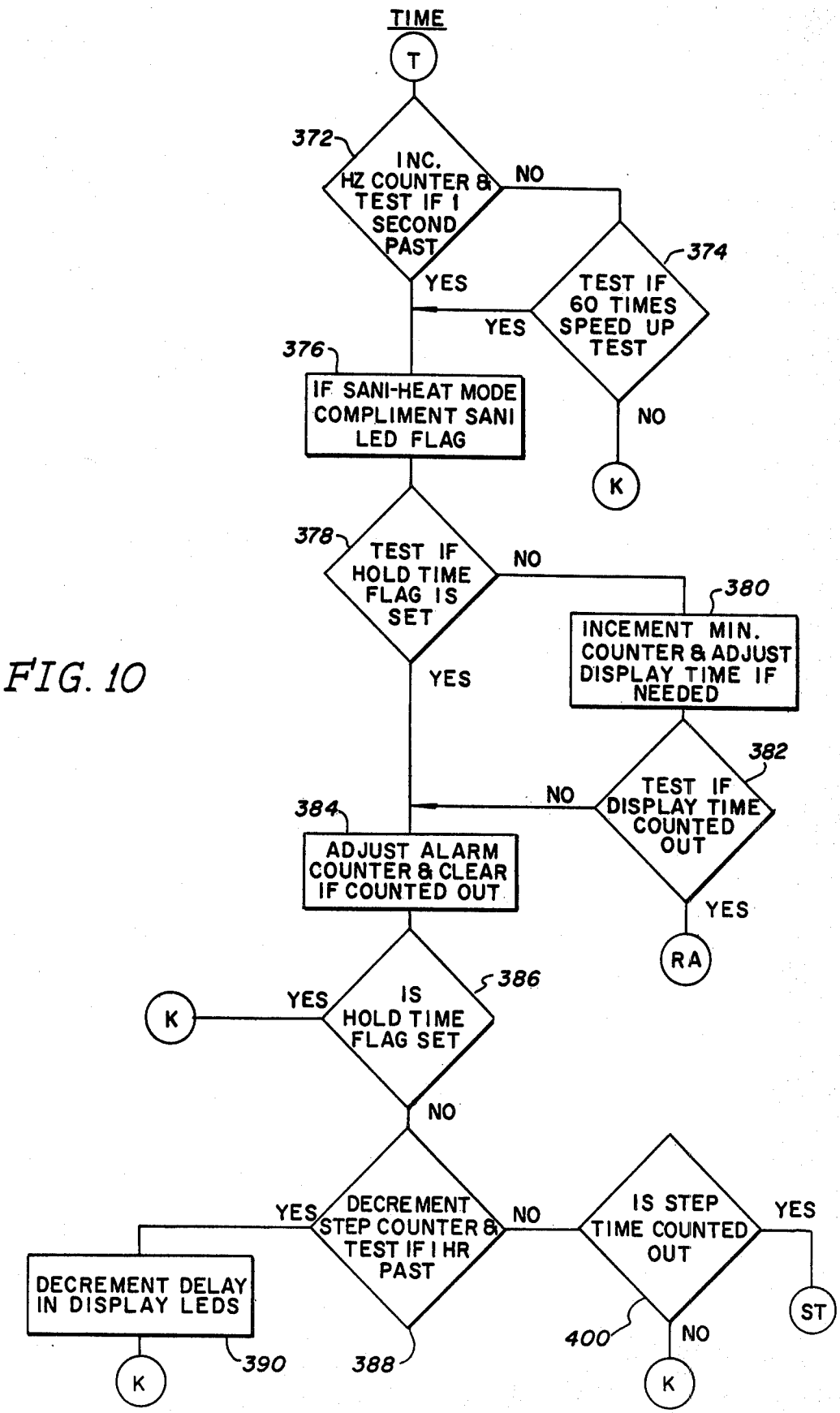

The time instruction group 312 is generally represented in FIG. 10. The first instruction block 372 of the time instruction group examines the register in which the line frequency is counted as received on pin P16 of the control element 12, and determines whether one second has passed. If one second has not passed, the program 300 proceeds to instruction block 374 where it determines whether it is supposed to operate in the speed up test mode of 60 times faster. This is a test of whether the terminals T26 and T28 of FIG. 1 are connected. If it is not, the program is directed to the keyboard instruction group 322 of FIG. 3. Thus, if both one second has not passed and the program 300 is not in the speed up test mode, it short circuits the time instruction group 312 and proceeds to the keyboard instruction group 322. At instruction block 372, if one second has passed, the program proceeds to instruction group 376 wherein, if the sani-heat function is on, it compliments the flag containing information for the sani-heat light emitting diode 203. Next the program proceeds to instruction block 378 where it determines whether the hold time flag is set and if it is not, the program proceeds to instruction block 380 where it increments the minute counter and adjusts the display time if that is needed. After this, the program proceeds to instruction block 382 where it tests to see if the display time is counted out. If it is, the program 300 proceeds to the rinse agent count instruction group 320 of FIG. 3. The block 382 is used as a safety measure. If the display time should be counted out before the step time, the block 382 ends the operation by directing the program through the rinse agent group 320 and back to the power up group 302. If the display time is not counted out, the program 300 proceeds to instruction block 384 where it adjusts the alarm counter and clears that counter if the time is counted out. The program 300 would also proceed here from instruction block 378 in the event that the hold time flag is set. By this arrangement, the hold time flag is used to prevent decrementing of the display time in the event that the program is either in the delay, flood or sani-temp modes. Next the program 300 proceeds to instruction block 386 where it again asks whether the hold time flag is set. If it is, the program 300 proceeds to the keyboard instruction group 322. If it is not, the program 300 proceeds to instruction block 388 where it decrements the step counter and tests if one hour has passed. If the one hour has passed, the program 300 proceeds to instruction block 390 where it decrements the delay which is displayed by the display means 20. After this, the program 300 proceeds to the keyboard instruction group 322. If one hour has not passed, the program 300 proceeds to instruction block 400 where it tests to see if the time is counted out. If it is not, the program 300 proceeds to the keyboard instruction group 322. If the time is counted out, the program 300 proceeds to the increment step instruction group 316. Thus, the instruction block 400 represents the instruction group 314 of FIG. 3 in testing whether the time is counted out. If the time is counted out, the program will proceed to increment the next step and if the step time is not counted out, the program will proceed to the keyboard instruction group 322 to test the pushbutton inputs 115 through 124 to determine if any further information is being inputted. Several input functions may be locked out once a predetermined amount of time has elapsed in the performance of a function. However, some functions may still be selectable in the middle of any operation, such as the cancel and drain function of push-button 124. The keyboard instruction group 322 is generally represented by the flow chart of FIG. 11. The first instruction block 402 includes instructions to determine whether any key is pressed. If not, the instruction program proceeds to block 404 where it asks whether the delay key has just been released. If not, the program 300 proceeds to the instruction block 406 and clears a key input buffer. If the delay key was just released, the program proceeds to instruction block 408 where it loads the full delay time into a register and clears the step time counter. After this, the program again proceeds to the instruction block 406 where it clears the key input buffer. The key input buffer is merely a register which receives the key input information. The instruction blocks 404, 406 and 408 allow an operator to select a display time by pressing the delay button. In response to this pressing, the program 300 increments the display time in one hour periods and the operator merely releases the button upon reaching the desired delay period. Thus, when the operator releases the button, the key input buffer or register for the delay button will have an indication that the button has been pressed but the answer to instruction block 402 will be no, as no key is then being pressed. Instruction block 404 looks at the key input buffer or register to see if that flag has been set. If not, it clears the buffer and proceeds to the display group 304. If the flag has been set, it means that delay has been selected and the button has been released. At this point, the program 300 proceeds from instruction block 404 to instruction block 408 where it loads the delay time which has been selected from an incremental counter and also clears the step time counter. After this, the program 300 also clears the key intput buffer and then proceeds to the display group 304.

Returning to instruction block 402, if a key is being pressed, the program 300 proceeds to instruction block 410 where it tests to determine if a test code is being entered on the pushbuttons 115 through 124. To perform this test, the control element 12 simultaneously pulses lines L1, L2 and L3 and observes input pins P9, P6 and P12 to see if the output pulse is present. Thus, a test code may be entered through the pushbuttons by simultaneously pushing at least one pushbutton in each of the three horizontal groups. In other words, to enter the test code, an operator must at least simultaneously press one button from the group of pushbuttons 115, 118 and 122; one pushbutton from the group of pushbuttons 116, 119 and 123; and one pushbutton from the pushbuttons 117, 120 and 124. If a signal is simultaneously determined on each of the input pins P9, P6 and P12, the program 300 then proceeds to instruction block 412 where it pulses simply the L1 output line and again looks for the three simultaneous inputs in order to determine if the proper coding is being entered for engaging the test mode; that is, if it is in fact pushbuttons 115, 116 and 117 which are being pressed. The pushbuttons correspond to the rinse and hold, plate warm and delay start functions, respectively. If the improper test code is entered, the program proceeds to an instruction block described below in the encode group 324 in which it restores old data and flags. If the proper test routine is being pressed, the program proceeds to instruction block 414 where it tests to determine whether it is the first instruction inputted into the machine. If not, it recognizes the code as erroneous and simply returns to the display routine. If it is the first time the test code is being pressed, instruction block 414 verifies the code and directs the program 300 to the encode instruction group 324 of FIG. 3. When the test mode is selected, the program may be stepped by sequentially depressing the plate warm button.

Returning to instruction 410, if the test code is not detected the program 300 proceeds to instruction block 416 where it tests to determine if the delay key, pushbutton 117, is being held down. If it is being held down, the program proceeds to instruction block 418 in FIG. 12 where it first tests to again determine whether the delay key is being pressed and also if one second has passed. If the answer to either is no, the program 300 proceeds to the display instruction group 304. If both conditions are met, the program proceeds to instruction block 420 where it increments the delay time period. Thus, an operator may choose the delay time desired by holding the delay button 117 which will cause the program to increment the delay time in one hour intervals at a rate of one hour per second. The operator need only release the delay-start button at the point where the desired delay time is displayed, to select that time. Returning to instruction block 416, if the delay button 117 is not being held down, the program proceeds to instruction block 422 where it reads the key input lines L10 through L13 to determine which pushbutton is being pressed. After determining this, the program 300 proceeds to instruction block 424 where it determines whether the button being pressed has been locked out. This function prevents an operator from acidentally engaging an undesirable function once a different function is engaged. For instance, if a wash or rinse or pot wash function is selected, the operator is prevented from switching to a plate warm function. The lock-out feature is handled by the program 300 in the encode instruction group 324. If the key pressed has been locked out, the program 300 proceeds to the encode instruction group 324 which restores data and flags in various registers. If the key being pressed has not been locked out, the program otherwise proceeds to the encode instruction group 324.

The encode instruction group 324 is generally represented by FIGS. 13A through 13H, in which the first instruction block 426 causes the program 300 to again re-read the input pushbuttons 115 through 124. The program then proceeds to instruction block 428 wherein it sounds the alarm 24 of FIG. 1 to give the operator an audible signal that he has pressed a button or that his selection has been registered. The program 300 then proceeds to instruction block 430 where it distinguishes between the various possible inputs and directs the program 300 according to those inputs. If no key is pressed, the program is directed to FIG. 13B. If the heat-dry button is pressed, the program is directed to FIG. 13B. If the sani-heat option is selected, the program is directed to FIG. 13C. If the cancel and drain function is selected the program is directed to FIG. 13D. If the test function is selected by the pressing of pushbuttons 116, 117 and 118, the program is directed to FIG. 13E. If the delay function is selected, the program is directed to FIG. 13F. If the rinse and hold function is selected, the program is directed to FIG. 13G If the plate warm function is selected the program is directed to FIG. 13H. If any of the four wash cycles short wash, economy wash, normal wash or pots and pans is selected, the program is directed to instruction block 432 which determines which of the four wash cycles has been selected. The program 300 is then directed to instruction block 434 where it loads the proper code for the selected wash function. After this, the program is directed to point "L" of FIG. 13G.

Figure 11:
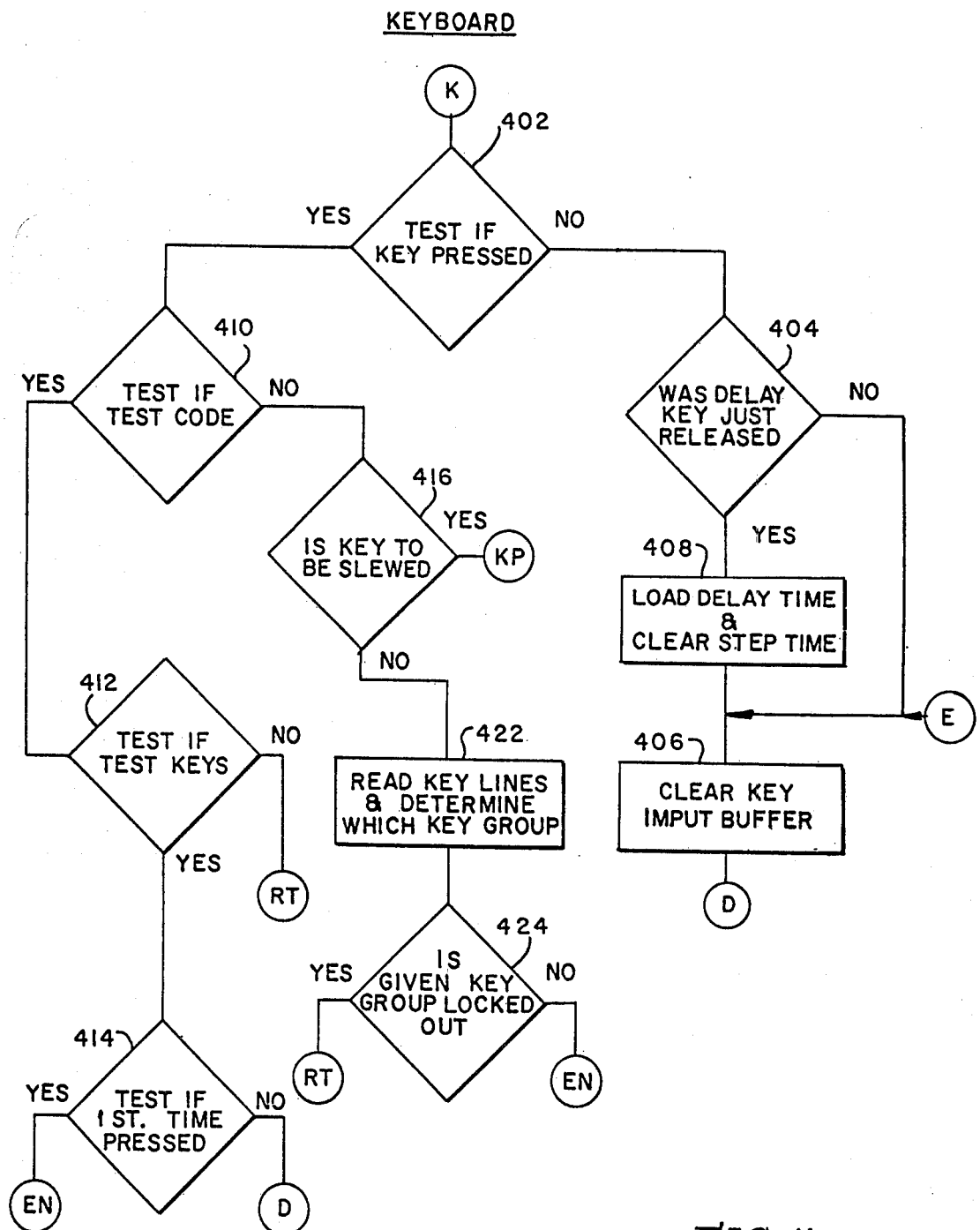
Figures 12, 14:
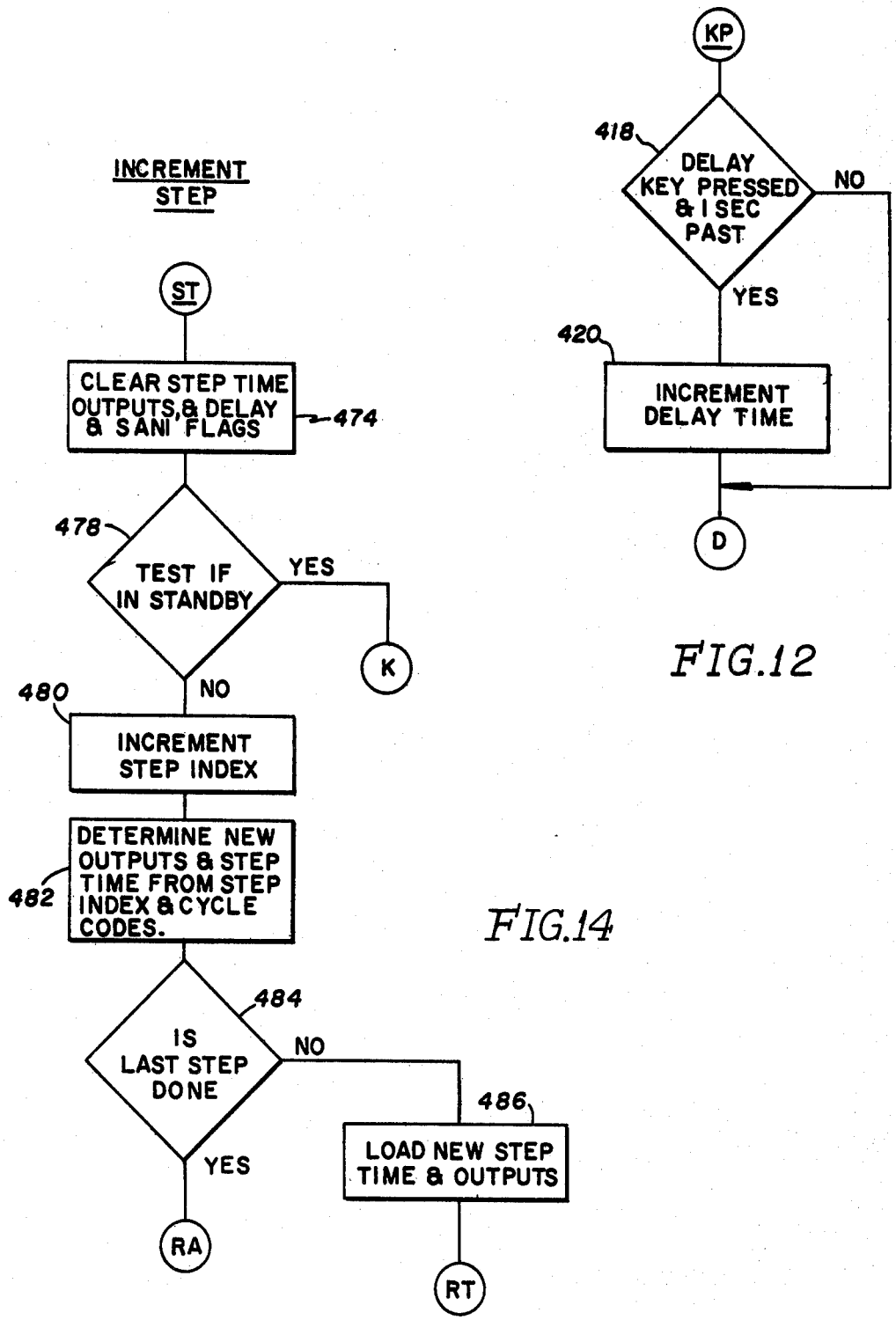
Figure 13A:
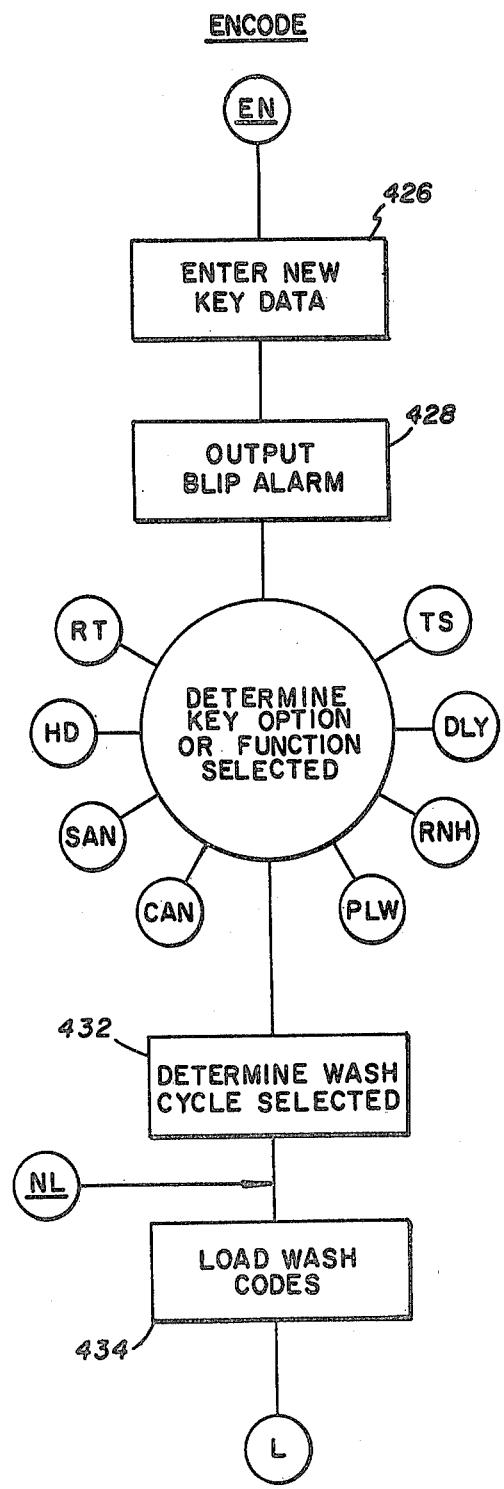
Figures 13B, 13C, 13D:
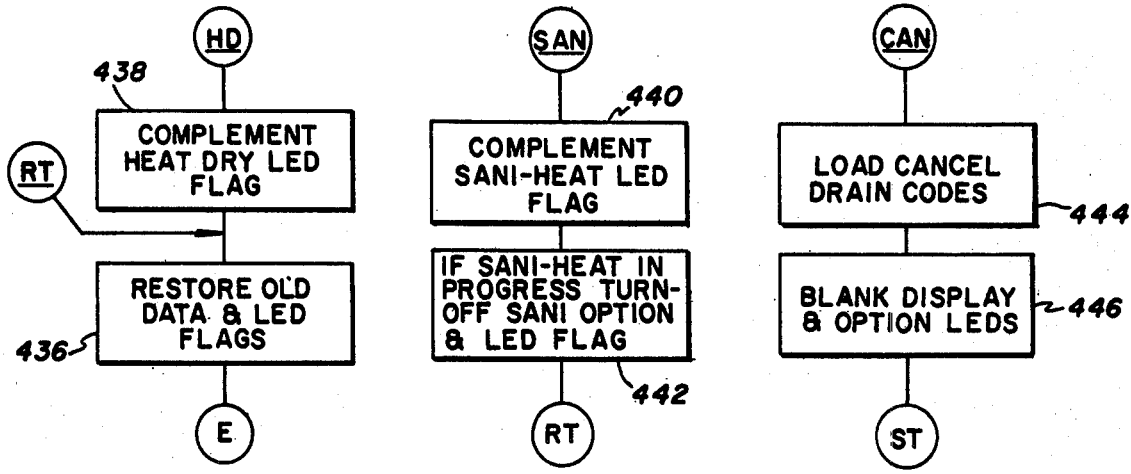

Returning to the options available at instruction block 430, if no key is pressed, the program 300 proceeds to point "RT" of FIG. 13B, In this Figure, the program enters instruction block 436 in which it resets old data and LED flags, and then proceeds to instruction block 406 of FIG. 11 where it clears the input key buffer and returns to the display group 304. If the heat-dry or hot-dry option is found at instruction block 403, the program 300 also proceeds to FIG. 13B, where it enters instruction block 438 to compliment the heat-dry LED flag, a register which records the facts that a heat-dry function has been selected. The program then proceeds to instruction blocks 436 and 406 and returns to the display group 304. If instruction block 430 determines that a sani-heat function has been selected, the program 300 is directed to FIG. 13C where it enters instruction block 440. Here it compliments the sani-heat LED flag which also is simply a register to record that the sani-heat function has been selected. The program then proceeds to instruction block 442 where it questions whether the sani-heat function is already in progress and if it is, it turns off the option and the LED flag therefor. Thus the sani-heat pushbutton may be used during a sani-heat function to disengage that function. After this, the program 442 proceeds to instruction block 406 of FIG. 11 and then to the display group 304. If the instruction block 430 determines that the cancel and drain has been selected, the program is directed to FIG. 13D where it enters instruction block 444. Here the program loads the cancel and drain codes into predetermined registers and then proceeds to instruction block 446 where it blanks the output registers for the display means 20. The program then proceeds to the increment step group 316 which is described below. If instruction block 430 determines that the test sequence has been selected with the pushbuttons 115, 116 and 117 of FIG. 1, it directs the program 300 to FIG. 13E. Here, the program enters instruction block 448 where it asks whether a cycle is already in progress. If no cycle is in progress, the control element 12 realizes that the test signal is erroneous and proceeds to instruction block 450 where it loads the proper codes for a normal wash cycle. The program then proceeds to point "NL" of FIG. 13A and instruction block 434 where it proceeds with the normal wash cycle. On the next loop through the instruction block 430, the program will again be directed to FIG. 13E where the answer to instruction block 448 will then be yes as a normal wash cycle will be in progress thus causing the program 300 to proceed to instruction block 452. Here the program asks the question whether a delay is in progress and if it is, is directed to instruction block 454 where it clears that delay. Then the program 300 proceeds to instruction 456 where it clears the step time and sets for the test mode. If a delay is not in progress at instruction block 452, the program proceeds to instruction block 458 where it subtracts the step time remaining from the display time. The program then proceeds through instruction block 456, 436, 406 and returns to the display instruction group 304. The actions of instruction block 458 caused the answer to instruction block 400 to be yes which causes the next step in the selected function to be engaged or initiated in the increment step instruction group 316. As mentioned, once the test function has been selected by the pressing of buttons 115, 116 and 117, the steps may be incremented by repeatedly pressing the plate warm button. This function is described below in reference to FIG. 13H.

Figures 13F, 13H, 15:
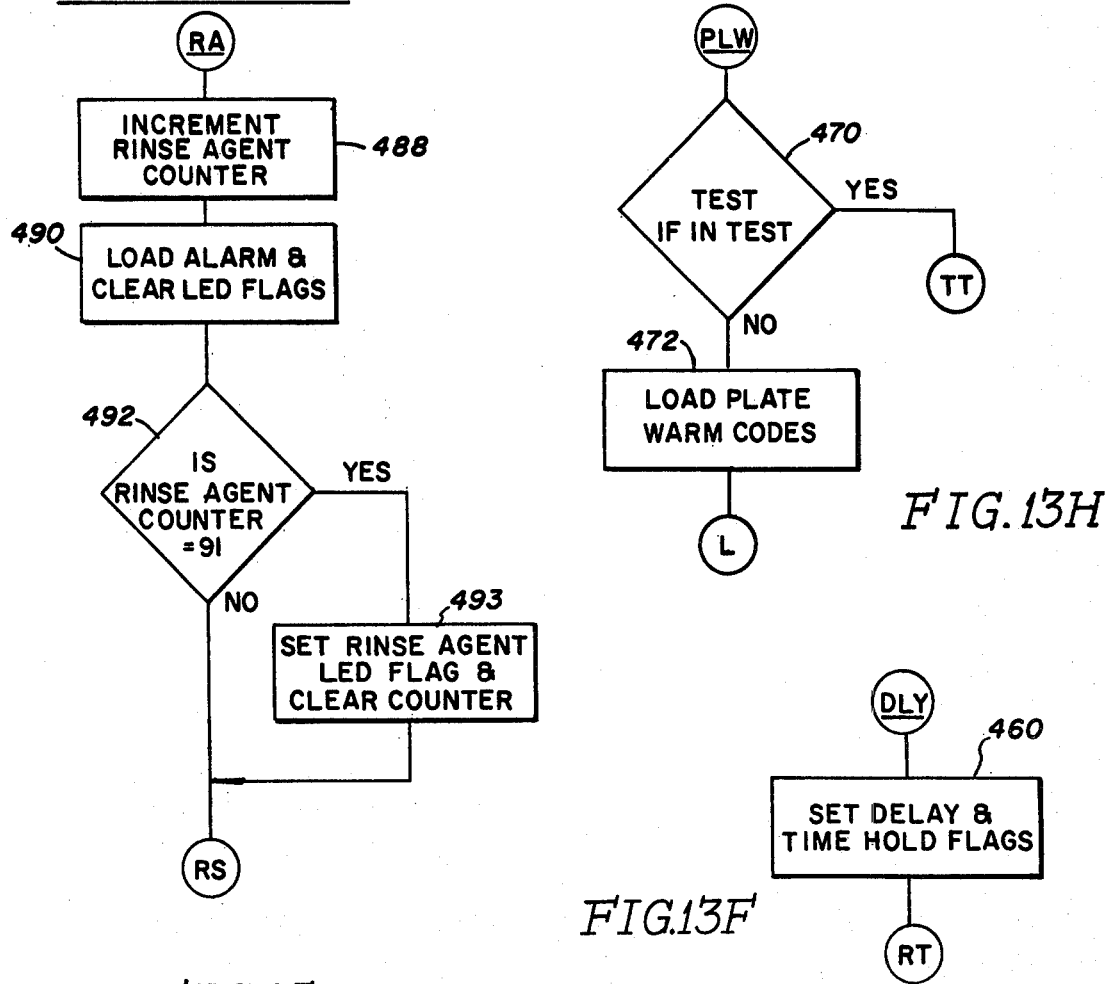

If the delay mode is detected in instruction block 430, the program 300 is directed to FIG. 13F where it enters instruction block 460 to set a delay and hold time flags. The program then proceeds as previously described to point "RT" of FIG. 13B. If instruction block 430 determines that the rinse and hold function has been selected, the program is directed to FIG. 13G where it first enters instruction block 462 to enter the rinse and hold codes. The program then proceeds to instruction block 464 where it loads the wash display time. The program 300 then proceeds to instruction block 464 where it loads the correct wash display time in certain registers. The program may also reach this point from other points in the instruction as indicated by the letter "L". The various times loaded are five minutes for the rinse and hold function, 46 minutes for the short wash function, 59 minutes for the economy and normal wash function and 86 minutes for the pot wash function. The program then proceeds to instruction block 466 where it clears old options and turns on the add-a-dish flag. Functionally an operator is allowed to add-a-dish for the first five minutes, or until the first dispense cycle is reached. Once the add-a-dish flag, represented by LED 201 of FIG. 1, goes out a full lock-out of all pushbuttons other than the cancel and drain sani-heat and heat-dry functions are effected. The program then proceeds to instruction block 468 where it loads a four second delay in a register if the program is not already in a delay mode or a cycle is not in progress. The program then proceeds to instruction block 406 of FIG. 11 and continues as previously described.

If the instruction block 430 detects the plate warm function, it directs the program to FIG. 13H. As the plate warm pushbutton may be used for either the plate warm function or incrementing steps in the test mode, the program first tests, in instruction block 470, whether a test mode has been selected. If it has, the program is directed to point "TT" of FIG. 13E. If the test function has not been selected, the program continues to instruction block 472 where it loads the proper plate warm code and 13 minutes for the display time. The program then proceeds to point "L" in FIG. 13G.

The remaining major group of instructions to be discussed is the increment step instruction group 316. The program reaches this instruction group either from the instruction block 400 of group 314 or from instruction block 446 of FIG. 13D. The first instruction block 474 causes the program to clear the step time, outputs, delay and sani-wash flags. Next, the program proceeds to instruction block 478. If functions have not been selected, the program should be in a stand-by mode and thus there would be no steps for this instruction group to increment. For this reason, the program 300 is directed to the keyboard 322. If the control element 12 or program is not in the stand-by mode, the program proceeds to instruction block 480 where it increments the step index. The program then proceeds to instruction block 482 to determine the new outputs and step time from the step index and the cycle codes. Cycle codes in this case refer to the selected functions, such as normal wash or pot wash. The program performs the function of this block by first determining which step it is in from the step index and then determining which function or cycle it is in by testing the various codes which would have been loaded in different parts of FIGS. 13A through H. Once the program knows its step and the function or cycle code, it can determine the new step time, or time for performing the sequential step to be initiated, in addition to the outputs necessary to perform that step. Next the program proceeds to instruction block 484 to determine whether the last function has been performed. If not, the program proceeds to instruction block 486 where the new step time and outputs are set. The necessary lock-out flags used by instruction block 424 of FIG. 11 are also set at this point. The program then proceeds to instruction block 436 of FIG. 13B. If the last step has been accomplished at instruction block 484, the program proceeds to the rinse agent instruction group 320 of FIG. 3.

The group 320 is generally represented in FIG. 15. The first instruction block 488 increments a counter to keep track of the number of times that the dishwasher has been operated, or the number of times that any wash function has been performed. The program then proceeds to instruction block 490 where it loads the necessary alarm time and clears the flags. This allows for a short alarm to be sounded at the end of the washing operation to apprise the operator of that fact. The program then proceeds to instruction block 492 where it tests the rinse agent counter to determine if the number of times that the dishwahser has been operated equals 91. If the counter does equal 91, the program proceeds to instruction block 493 where it sets the rinse agent LED flag and resets the rinse agent counter. By this configuration, a dispenser within the dishwasher may be loaded with approximately 3 months or more worth of rinse agent, the dishwasher may be operated once a day for that period and the rinse agent LED flag will come on at that time to prevent the dispenser from running out of rinse agent. If the rinse agent counter does not equal 91, and/or after the rinse agent flag has been set and the rinse agent counter cleared, the program proceeds back to instruction block 332 of FIG. 4 to await instructions for its next operational cycle.

The control system of the present invention provides several advantages. It provides a great deal of flexibility in the performance of various machine functions and conveniences in the use of this flexibility. It allows the operation of the apparatus to be fine tuned to a number of circumstances such as the degree of cleaning desired or the desired speed of operation. It allows the starting of the function after a given delay for purposes such as avoiding using electricity during times of peak loading or peak load billing. It provides the dispensing of an agent with an indicator when the agent level gets low to avoid the need for frequent replenishing. It allows the engagement of a test mode of operation by use of the normal function selection means, thus saving a repairman unnecessary trouble during testing. The repairman also may increment steps in the test mode by repeatedly engaging the normal selection means. The above control system also prevents damage to operative elements of the apparatus as a result of a power brown-out by disengaging operative elements whenever a brown-out occurs.

Another embodiment of the present invention is shown in FIGS. 16 through 20. Reference numbers which appear in FIGS. 16 through 20, which are the same as reference numbers appearing in FIGS. 1 through 15 identify the same or similar elements performing the same or similar functions. Therefore, the only elements identified hereinbelow bear reference numbers of 500 or higher and are elements which are new or different in type or function from elements in FIGS. 1 through 15.

Figure 16A:
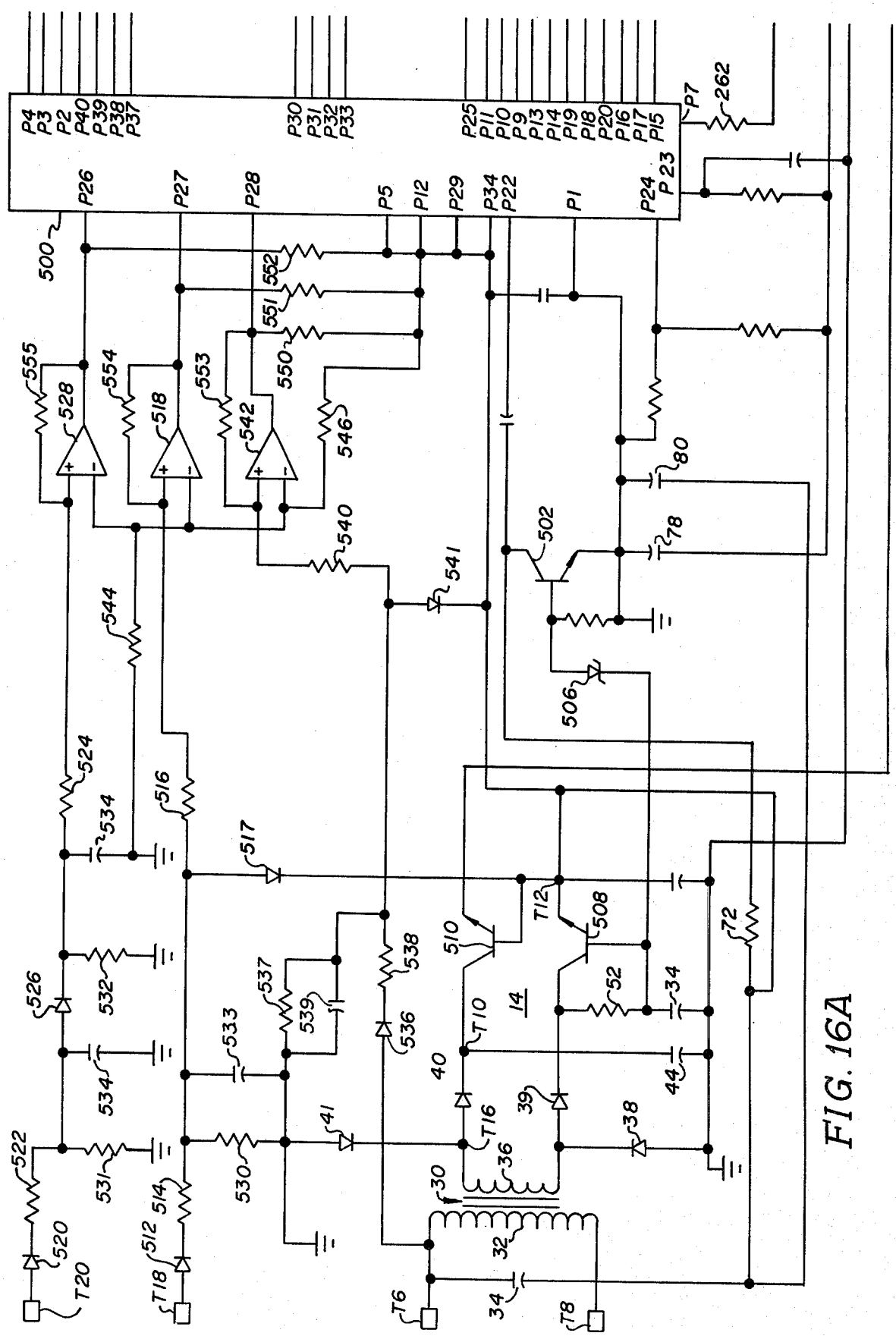
FIGS. 16a, 16b and 16c, is a schematic diagram of a control system constructed according to another embodiment of the present invention.
Figure 16B:
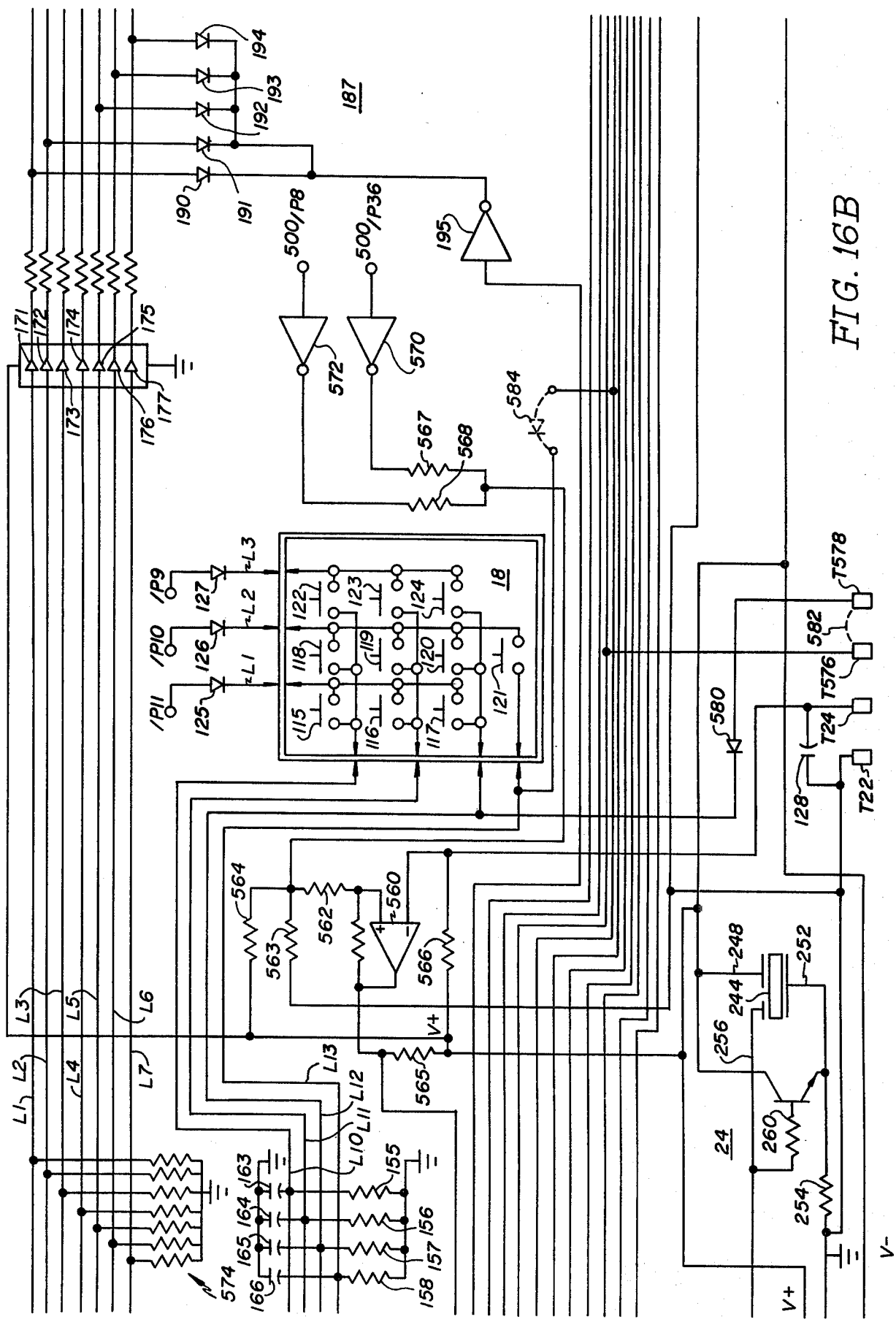

A central control element 500 is used in the embodiment of FIG. 16 which element 500 is a microcomputer made by American Microsystems, Inc. of Santa Clara, Calif. and designated S2150. The control element 500 includes an instruction program similar to that of element 12 in FIG. 1. The differences of the program in control element 500 are discussed in detail below.

The power supply section 14 is the same as that of FIG. 1a except that the polarities are reversed and the voltage regulation circuit is combined with the power-on reset circuit of FIG. 1a.

The voltage provided at output terminal T12 is a positive (+) 9.1 volts DC. Voltage regulation is provided by transistor 502, resistor 504, zener diode 506, and transistors 508 and 510. Thus, the voltage at terminal T12 is equal to the sum of the reverse bias voltage of zener diode 506 and the 0.6 volt forward bias voltage drop of the emitter base junction of transistor 502 minus the 0.6 volt forward bias voltage drop of transistor 508. The output voltage at the emitter of transistor 510 is lower by yet another 6 volts as the forward bias voltage drop of the emitter base junction. In one embodiment, the zener diode 506 has an 9.1 volt reverse bias voltage drop.

With respect to the sensing of operating conditions within the washing apparatus, terminals T18 and T20 are connected to float and door switches as in the embodiment of FIG. 1. A diode 512 has its anode connected to the terminal T18 and its cathode connected through resistors 514 and 516 to the positive input of a voltage comparator 518. The door switch is coupled through terminal T20 which has the anode of a diode 520 connected thereto. The cathode of diode 520 is connected through a pair of resistors 522 and 524 and another diode 526 to the positive input of a voltage comparator 528. The resistors 514 516, 522 and 524 coupled between terminals T18 and T20 and their respective voltage comparators 518 and 528 are for voltage dropping purposes. The diodes 512, 520 and 526 are for rectifying purposes. Normally the door and float switches operate on line current and the signals appearing at terminals T18 and T20 are rectified and reduced in voltage level for input to the voltage comparators 518 and 520. Further resistors 530, 531 and 532 are also provided for voltage dropping purposes and capacitors 533, 534 and 535 are provided for filtering purposes. The output of voltage comparator 518 represents the condition of float switch and is coupled to terminal P27 of the microcomputer 500. The output of comparator 528 represents the condition of the door switch and is coupled through terminal T26 to the microcomputer 500.

Another sensory input is provided from the input line voltage at terminal T6. The anode of a diode 536 is coupled thereto with its cathode connected through a resistor 538 and a resistor 540 to the positive input of another voltage comparator 542. Comparator 542 is coupled to terminal P28 of control element 500. The negative inputs of voltage comparators 518, 528 and 542 are connected in common and biased by a pair of resistors 544 and 546, which are connected in series between ground and the positive voltage potential of T12. Voltage comparators 518, 528 and 542 also have coupled thereto a plurality of resistors 550 through 555 for biasing and feedback purposes.

A further condition input to microcomputer 500 is temperature. Circuitry is provided for coupling a thermistor connected between terminals T22 and T24, to a voltage comparator 560 to test for three separate temperature points. The output of comparator 560 is connected to pin P25 of microcomputer 500. A plurality of biasing resistors 562 through 568 are coupled to the various input and output terminals of voltage comparator 560 to provide for testing for the various temperatures. A pair of inverters 570 and 572 are coupled from microcomputer 500 pins P36 and P8, respectively, through resistors 567 and 568, respectively, to an input of voltage comparator 560 for enabling the microcomputer 500 to control which temperature is being tested for. By energizing either none, one, or the other of output terminals P8 or P38, the microcomputer 500 can bias voltage comparator 560 to test for each of three temperatures at the thermistor connected to terminals T22 and T24. The microcomputer can then determine the water temperature sensed by the thermistor in accordance with the signal present at pin P25 and the output signals at pins P8 and P36.

Figure 16C:
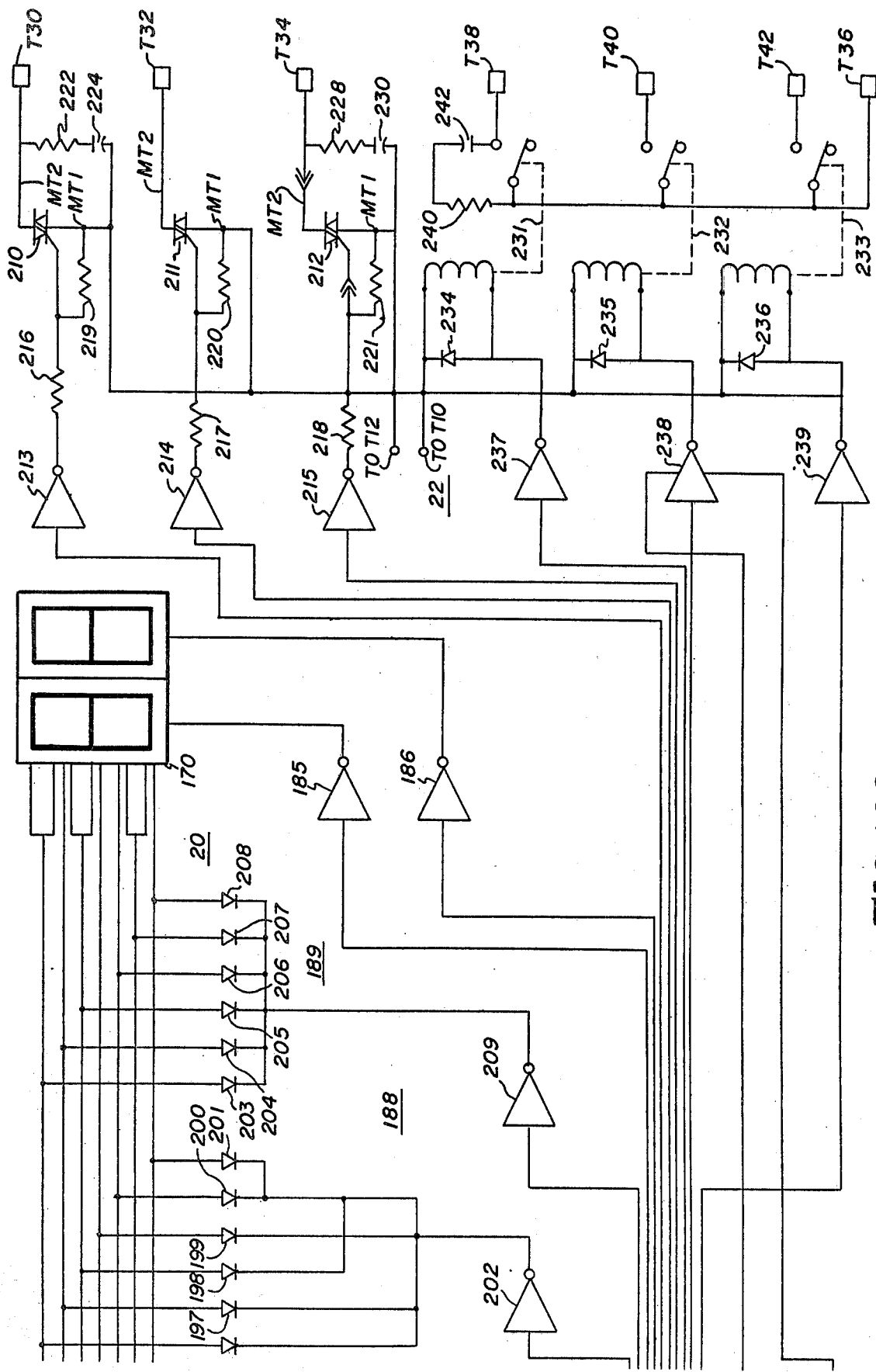

The output section of the circuit of FIG. 16 is similar to that of the circuit of FIG. 1 with the exception that several additional outputs are available. These outputs are used in FIG. 16 for sensing the multiple temperatures. Other differences lie in the use of a multiplicity of biasing resistors 574 one for each of the output lines P4, P3, P2, P40, P39, P38 and P37. Further, a pair of terminals T576 and T578 are provided for coupling a jumper diode 580 by its anode from output pin P13 to input pin P32 by its cathode. A jumper 582 is used to complete the connection which allows for the 60 times faster testing speed for the program. Further provision is made for installing a diode 584 between output pin P14 and input pin P33 for enabling the circuit of FIG. 16 to be used with 50 hertz line power. The only major difference remaining in respect to the circuit of FIG. 16 to that of FIG. 1 is the power source referencing of the output triacs 210 through 212 and the output relay 234 through 236. In FIG. 16c, the first main terminal of each of triacs 210 through 212 is coupled to the power supply section 14 at terminal T12 while the output relays 231 through 233 each have one end thereof referenced to power source terminal T10.

Figure 17:
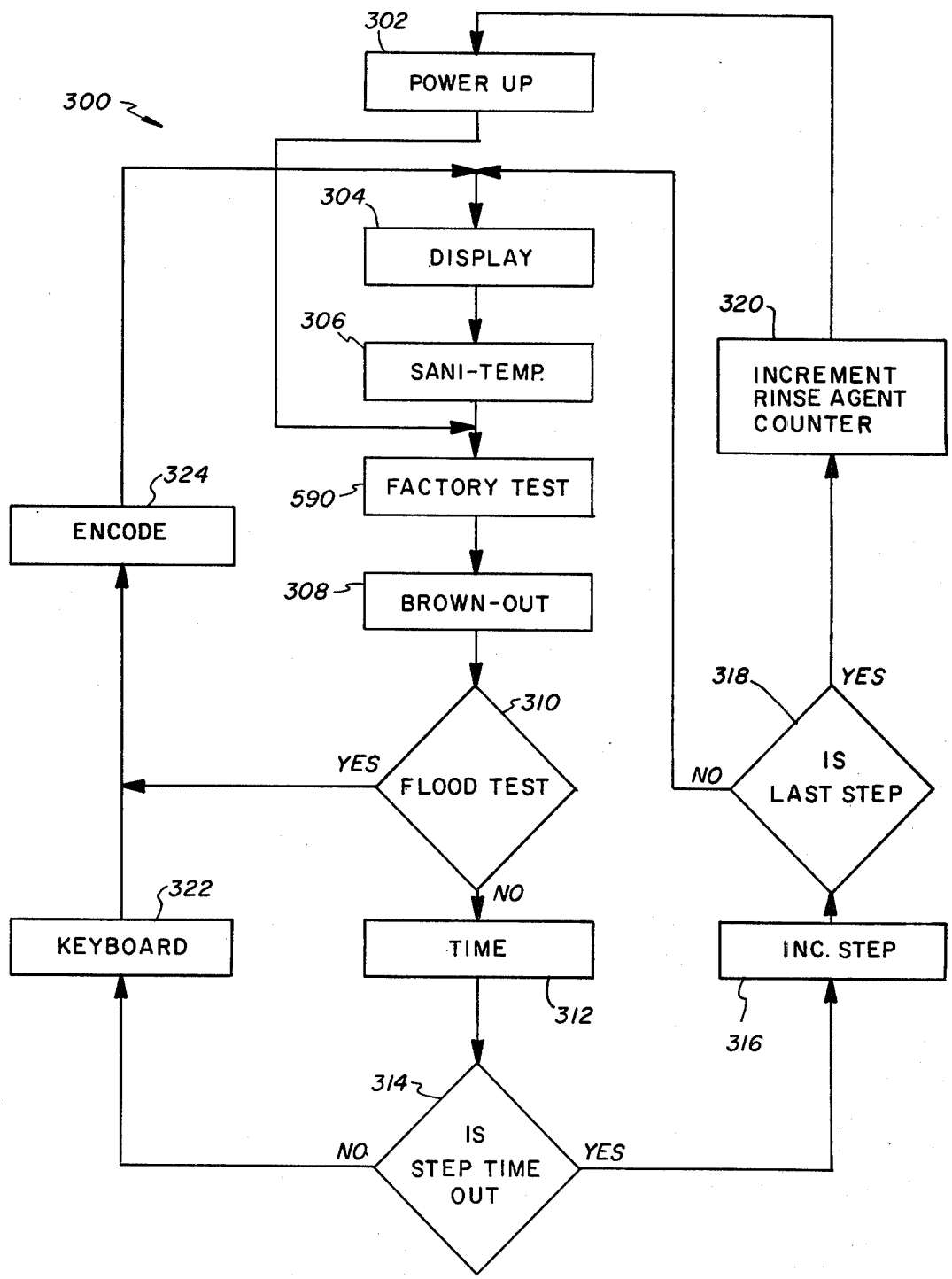
FIG. 17 is a generalized flow chart of an instruction program capable of effecting control of the dishwasher of FIG. 2 by the control system of FIG. 16, and FIGS. 18, 19 and 20 are more detail flow charts of portions of FIG. 17.

The software used by the microcomputer 500 is similar to that used with microcomputer 512 except for the differences explained below FIG. 17 is a flow chart of the overall software program used in microcomputer 500 and differs from the software program shown in FIG. 3 by inclusion of a factory test routine 590 located between the sani-temp routine 306 and the brown-out routine 308. Also, the power-up routine sequences into the factory test routine upon initial activation of the microcomputer 500 instead of into the display routine 304 as shown in FIG. 3. The factory test routine 590 includes instruction means for allowing factory inspection of the output functions of microcomputer 500 upon insertion of the jumper diode 584 as previously explained. The instruction means in the factory test routine 590 energize each of the display outputs and each of the functional outputs in a predetermined sequence and for one second periods to allow a test technician to observe those outputs to test the operation thereof in connection with the microcomputer 500.

Figure 18:
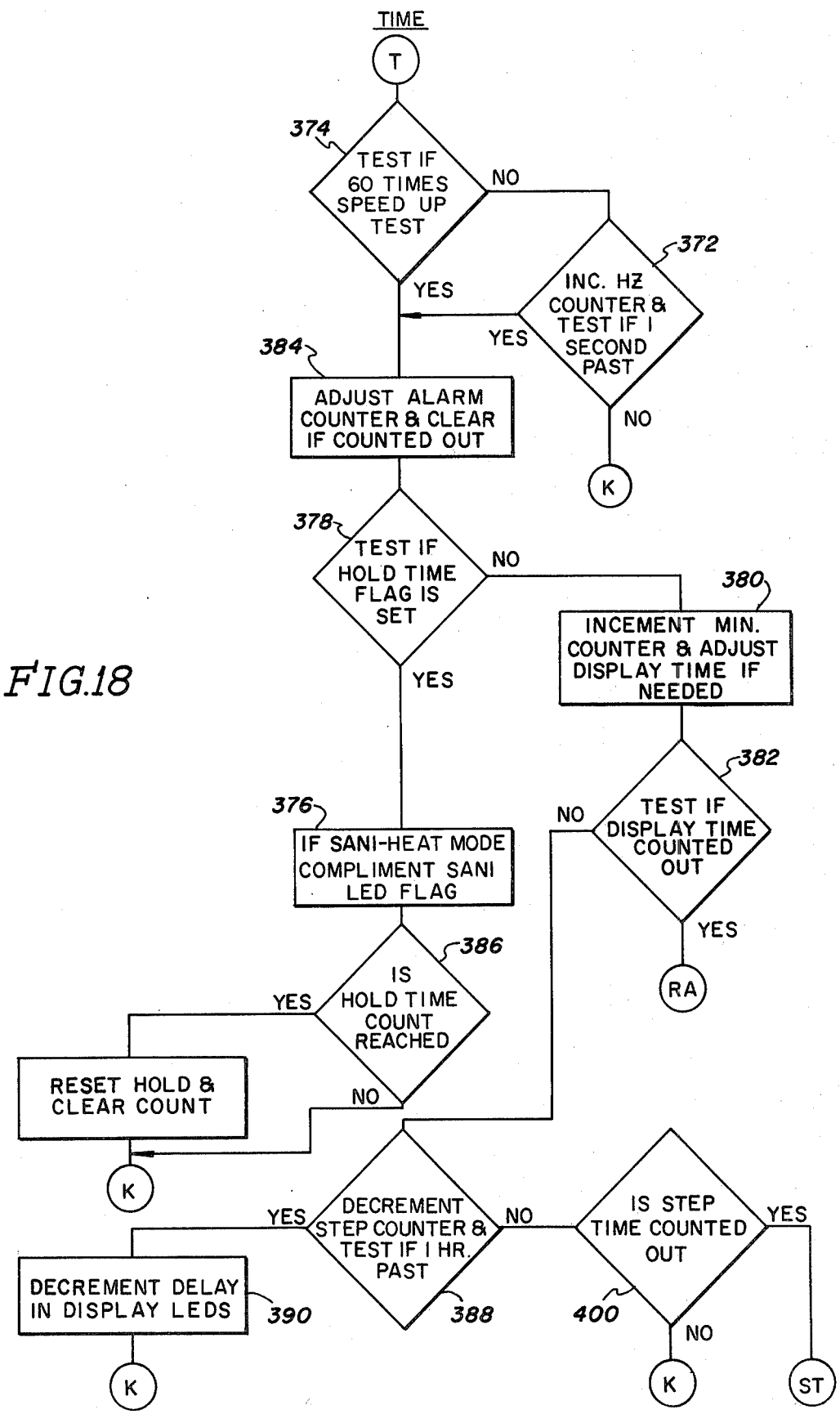

Several changes were also made in the timing portion of the software routine for microcomputer 500 as shown in FIG. 18, which corresponds to FIG. 10 for microcomputer 12. In FIG. 18, question blocks 372 and 374 have been reversed in position with the same end result remaining for given test results. Also instruction blocks 376 and 384 have been reversed. After instruction block 376, the program proceeds to decision block 591 which determines whether the hold time count has been reached. If it has been reached, the program proceeds to an instruction block 592 which resets the hold function and clears the hold counter. If the hold time count has not been reached in decision block 591 or after it has been reached and the counter has been cleared, the program proceeds to the keyboard routine. Further differences lie in the result of decision block 382 which if the display time is not counted out directs the program to decision block 388 which decrements the step counter and tests after one hour has passed.

Figure 19:
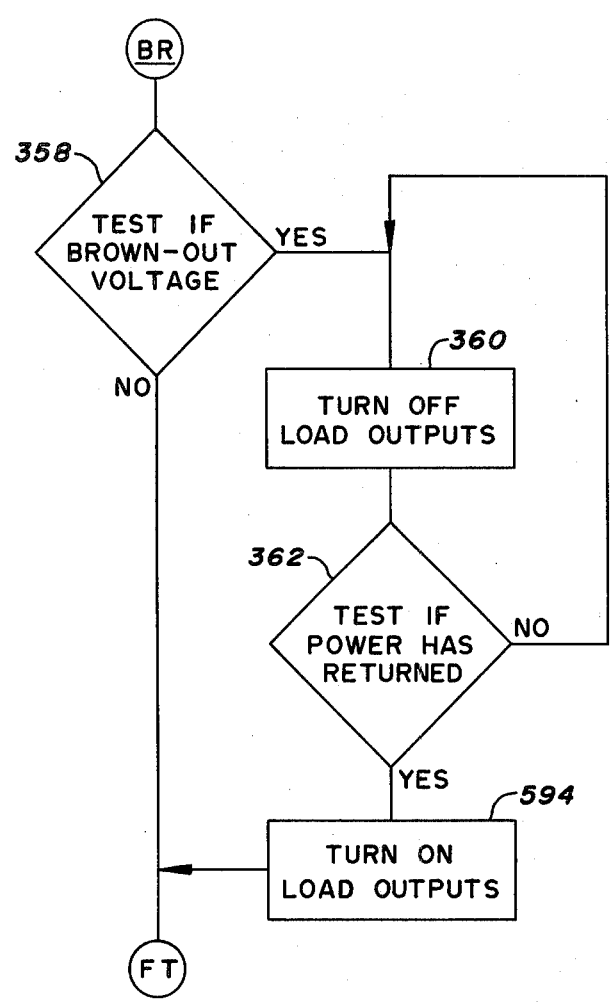

Other changes in the software routine have been made in the instruction means for handling brown-outs or low power line voltage situations. These changes are shown in FIG. 19 which corresponds to FIG. 7 for microcomputer 12. In instruction block 360, the microcomputer 500 turns off all microcomputer outputs including the LED output lines and the function control output lines. Once power has returned, the microcomputer then turns on all load outputs in instruction block 594.

Figure 20:
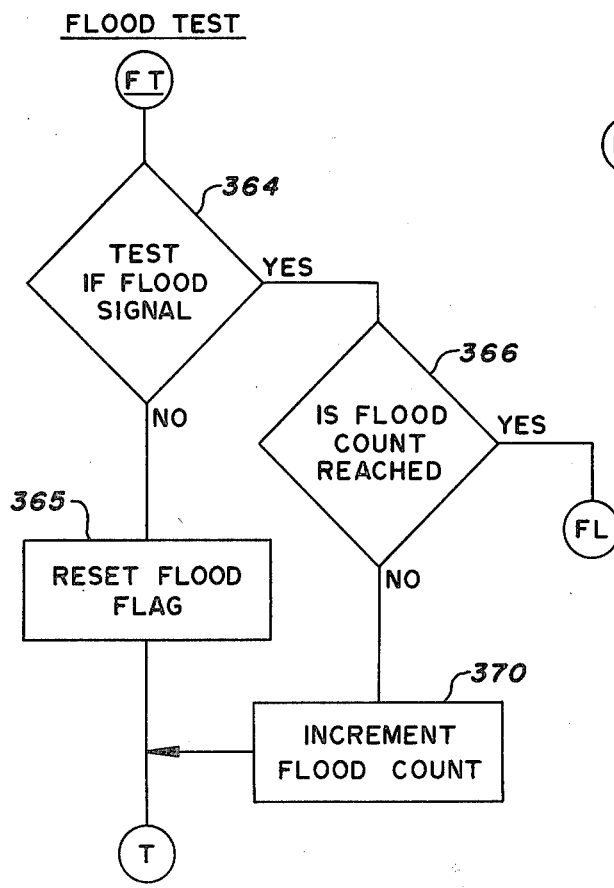

Additional soft-ware changes have been made in the flood testing routine. Where microcomputer 12 simply tested for flood conditions during two consecutive seconds, microcomputer 500 uses a four count counter to test for the existence of flood conditions during four consecutive seconds. This is accomplished as shown in FIG. 20 by changing decision block 366 to a test for whether the flood count has been reached and a change in instruction block 370 to increment the flood counter in the event that the flood count has not been reached. Thus, instead of the previous routine which would trigger a flood condition after testing conditions for two consecutive line cycles, the embodiment for microcomputer 500 tests for the distance of flood conditions for four consecutive seconds and thus reduces the possibility of wave action within the machine triggering the flood condition response.

It should be noted that the presently described embodiments are intended to be taken in an illustrative and not a limiting sense, and that various modifications and changes may be made to the present embodiments, by persons skilled in the art, without departing from the scope of the present invention as defined in the appended claims.

What is claimed is:

1. A control system for a dishwashing apparatus having a plurality of selectable wash functions, with each said wash function including a plurality of predetermined operational steps, comprising:

a control element including a microcomputer for controlling the performance of said dishwashing apparatus;

means for inputting selection of one of said wash functions to said control element;

means for interfacing said control element with said dishwashing apparatus for allowing direct control of said operational steps by said control element;

means for displaying wash function selections, operating conditions and operating times of said dishwashing apparatus; and an instruction program stored in said control element for affecting the operation of said control element, said instruction program having a sequence of instruction means groups for performance by said control element including a first instruction means group for controlling said display means, a second instruction means group following said first instruction means group for testing for the existence of said operating conditions and for delaying or advancing the progress of said control element through said instruction means groups in response to the tested existence of said operating conditions, a third instruction means group following said second instruction means group for testing for the existence of flood conditions in said dishwashing apparatus for at least four consecutive seconds and for affecting the operation of said apparatus in response to the tested existence of said flood conditions for at least four consecutive seconds, a fourth instruction means group following said third instruction means group for timing the operation of said wash functions and said operational steps for directing the progress of said control element in response to said timing, a fifth instruction means group following said fourth instruction means group for determining input selections to said dishwashing apparatus, and a sixth instruction means group following said fifth instruction means group for enabling said operational steps of said dishwashing apparatus in response to determined input selections from said fifth instruction means group and in response to said third instruction means group and for returning said control element to said first instruction means group thereafter.

2. The control system of claim 1, wherein said third instruction means group includes seventh instruction means for incrementing a flood counter during the performance of said third instruction means group by said control element in which flood conditions are found to exist, for zeroing said flood counter during the performance of said third instruction means group by said control element in which flood conditions are found to not exist, and for directing the progress of said control element to said sixth instruction means group when the count in said flood counter reaches a predetermined count.

3. The control system of claim 2, wherein said control element includes means for performing said third instruction group means once every second and said predetermined count for said flood counter is four.

4. The control system of claim 1, wherein said operating conditions include operating power voltage and further wherein said second instruction means group includes eighth instruction means for delaying the progress of said control element through said instruction program and for deactivating said means for displaying said operational steps through said means for interfacing in response to the tested operating condition of insufficiently high operating power voltage.

5. The control system of claim 1, wherein said instruction program includes a ninth instruction means group for activating each of said means for interfacing and each of said means for displaying in a predetermined sequence for functional testing in cooperation with said control element.

6. A method for controlling dishwashing apparatus by a control system including a microcomputer control element having an instruction program stored therein, said apparatus having a plurality of selectable wash functions with each said function including a plurality of predetermined operational steps, said method comprising:

determining input selections of said wash functions to said dishwashing apparatus;

enabling performance of said operational steps in response to said determined input selections of said wash functions;

displaying wash function selections, operating conditions and operating times for said wash functions;

testing for the existence of said operating conditions;

delaying or advancing performance of said operational steps in response to the tested existence of said operating conditions;

deactivating said enabling and said displaying steps in response to the tested operating condition of insufficiently high operating power voltage;

testing for the existence of flood conditions in said dishwashing apparatus;

setting a flood condition flag in response to the first tested existence of said flood conditions;

displaying the set condition of said flood condition flag;

retesting for the existence of flood conditions in said dishwashing apparatus;

initiating remedial action in response to the second sequential tested existence of said flood conditions as evidenced by said retesting and the set condition of said flood condition flag;

timing the performance of said wash functions and said operational steps in the absence of a second sequential tested existence of said flood conditions; and directing the operation of said dishwashing apparatus in response to said timing step.

* * * * *